(12) United States Patent
Nixon et al.

(10) Patent No.: US 9,983,575 B2
(45) Date of Patent: May 29, 2018

(54) SYSTEMS AND METHODS TO GRAPHICALLY DISPLAY PROCESS CONTROL SYSTEM INFORMATION

(71) Applicant: FISHER-ROSEMOUNT SYSTEMS, INC., Round Rock, TX (US)

(72) Inventors: Mark Nixon, Round Rock, TX (US); Maia B. Cook, Carlsbad, CA (US); Daniel I. Manes, San Diego, CA (US); Harvey S. Smallman, San Diego, CA (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 501 days.

(21) Appl. No.: 13/859,714

(22) Filed: Apr. 9, 2013

(65) Prior Publication Data

US 2014/0303754 A1    Oct. 9, 2014

(51) Int. Cl.
    *G05B 23/00*    (2006.01)
    *G05B 23/02*    (2006.01)

(52) U.S. Cl.
    CPC ............ *G05B 23/0267* (2013.01); *G05B 2219/31472* (2013.01)

(58) Field of Classification Search
    CPC ............ G05B 23/0267; G05B 2219/31472
    See application file for complete search history.

(56) References Cited

U.S. PATENT DOCUMENTS

| 5,167,010 A * | 11/1992 | Elm ............... G05B 13/028 376/259 |
| 5,631,825 A | 5/1997 | Van Weele et al. |
| 6,577,323 B1 | 6/2003 | Jamieson et al. |
| 6,587,108 B1 * | 7/2003 | Guerlain ......... G05B 23/0267 345/440 |

(Continued)

FOREIGN PATENT DOCUMENTS

| CN | 1658106 | 8/2005 |
| CN | 1950760 | 4/2007 |

(Continued)

OTHER PUBLICATIONS

International Searching Authority, "Search Report", issued in connection with PCT patent application No. PCT/US2014/025998, dated Oct. 13, 2014, 6 pages.

(Continued)

*Primary Examiner* — Christopher E Everett
(74) *Attorney, Agent, or Firm* — Hanley, Flight & Zimmerman, LLC

(57) ABSTRACT

Systems and methods to graphically display process control system information are disclosed. Some example methods include monitoring process variables in a process control system, determining a current state of a first one of the process variables, and determining a trend associated with the first process variable. Some such examples further include generating a first graphic representative of information associated with the first process variable, the information comprising the current state of the first process variable (Continued)

and the trend of the first process variable. Some example methods also include rendering the first graphic via a display.

29 Claims, 17 Drawing Sheets

(56) References Cited

U.S. PATENT DOCUMENTS

| | | | | |
|---|---|---|---|---|
| 6,901,560 | B1* | 5/2005 | Guerlain | G05B 19/409 |
| | | | | 715/764 |
| 6,952,808 | B1* | 10/2005 | Jamieson | G05B 19/409 |
| | | | | 715/764 |
| 7,023,440 | B1* | 4/2006 | Havekost | G05B 23/0267 |
| | | | | 345/440 |
| 7,647,126 | B2 | 1/2010 | Blevins et al. | |
| 7,729,789 | B2* | 6/2010 | Blevins | G05B 17/02 |
| | | | | 345/418 |
| 8,086,955 | B2 | 12/2011 | Zhou et al. | |
| 8,825,183 | B2 | 9/2014 | Hammack et al. | |
| 2002/0055790 | A1* | 5/2002 | Havekost | G05B 23/027 |
| | | | | 700/80 |
| 2003/0028268 | A1* | 2/2003 | Eryurek | G05B 17/02 |
| | | | | 700/73 |
| 2003/0028269 | A1 | 2/2003 | Spriggs et al. | |
| 2004/0186927 | A1 | 9/2004 | Eryurek et al. | |
| 2005/0188376 | A1 | 8/2005 | Matsumoto et al. | |
| 2007/0132779 | A1 | 6/2007 | Gilbert et al. | |
| 2007/0135944 | A1 | 6/2007 | Schmid et al. | |
| 2007/0239291 | A1* | 10/2007 | Wayland | G05B 23/0272 |
| | | | | 700/83 |
| 2007/0260499 | A1 | 11/2007 | Greef et al. | |
| 2008/0125877 | A1* | 5/2008 | Miller | G05B 15/02 |
| | | | | 700/29 |
| 2008/0172629 | A1 | 7/2008 | Tien et al. | |
| 2008/0183445 | A1 | 7/2008 | Bissantz | |
| 2008/0189638 | A1* | 8/2008 | Mody | G05B 19/0426 |
| | | | | 715/771 |
| 2009/0019385 | A1* | 1/2009 | Khatib | G06F 9/4443 |
| | | | | 715/765 |
| 2009/0054743 | A1* | 2/2009 | Stewart | G06T 11/206 |
| | | | | 600/301 |
| 2009/0149981 | A1* | 6/2009 | Evans | G05B 23/0254 |
| | | | | 700/110 |
| 2009/0164933 | A1* | 6/2009 | Pederson | G05B 19/409 |
| | | | | 715/772 |
| 2009/0319891 | A1 | 12/2009 | MacKinlay et al. | |
| 2010/0017743 | A1 | 1/2010 | Swanston | |
| 2010/0138763 | A1* | 6/2010 | Kim | G06F 1/1626 |
| | | | | 715/765 |
| 2010/0156654 | A1 | 6/2010 | Bullemer et al. | |
| 2011/0029102 | A1* | 2/2011 | Campney | G05B 15/02 |
| | | | | 700/83 |
| 2011/0144777 | A1 | 6/2011 | Firkins et al. | |
| 2011/0230980 | A1 | 9/2011 | Hammack et al. | |
| 2011/0258568 | A1* | 10/2011 | Pandurangan | G05B 19/409 |
| | | | | 715/771 |
| 2011/0292083 | A1 | 12/2011 | Nihlwing | |
| 2012/0029661 | A1* | 2/2012 | Jones | G05B 19/0426 |
| | | | | 700/17 |
| 2012/0259436 | A1 | 10/2012 | Resurreccion et al. | |
| 2013/0100136 | A1 | 4/2013 | Van Camp et al. | |
| 2013/0147630 | A1* | 6/2013 | Nakaya | G08B 5/22 |
| | | | | 340/691.6 |
| 2014/0039833 | A1* | 2/2014 | Sharpe, Jr. | G05B 23/0229 |
| | | | | 702/183 |
| 2014/0096057 | A1 | 4/2014 | Marston et al. | |
| 2014/0194089 | A1* | 7/2014 | Park | H04M 15/61 |
| | | | | 455/406 |
| 2014/0277619 | A1 | 9/2014 | Nixon et al. | |
| 2014/0277620 | A1 | 9/2014 | Nixon et al. | |
| 2014/0282195 | A1 | 9/2014 | Nixon et al. | |

FOREIGN PATENT DOCUMENTS

| | | |
|---|---|---|
| CN | 1950762 | 4/2007 |
| CN | 1950763 | 4/2007 |
| CN | 1950765 | 4/2007 |
| CN | 101140458 | 3/2008 |
| CN | 101460911 | 6/2009 |
| CN | 101620508 | 1/2010 |
| CN | 101681161 | 3/2010 |
| CN | 102096398 | 6/2011 |
| CN | 102269989 | 12/2011 |
| CN | 102736582 | 10/2012 |
| EP | 1331536 A1 | 7/2003 |
| EP | 1566757 A1 | 8/2005 |
| EP | 2100720 | 10/2009 |
| JP | S63257399 | 10/1988 |
| JP | 2004005639 | 1/2004 |
| JP | 2010123116 | 6/2010 |
| JP | 2011123885 | 6/2011 |
| KR | 20070062446 | 6/2007 |
| WO | 9509387 | 4/1995 |
| WO | 2005109126 | 11/2005 |
| WO | 2007121227 A2 | 10/2007 |
| WO | 2014145495 A2 | 9/2014 |
| WO | 2014151559 A2 | 9/2014 |
| WO | 2014151574 A1 | 9/2014 |
| WO | 2014151586 A1 | 9/2014 |

OTHER PUBLICATIONS

International Searching Authority, "Written Opinion", issued in connection with PCT patent application No. PCT/US2014/025998, dated Oct. 13, 2014, 10 pages.

Moray, Neville, "Human Factors in Process Control," in Handbook of Human Factors and Ergonomics, Chapter 58, pp. 1944-1971, 1997 (32 pages).

Anderson, J. R., et al., "Learning to Program Recursive Functions," in the Nature of Expertise, Chapter 5, pp. 153-183, 1998 (33 pages).

Cook, Maia B. et al., "Situation Displays for Dynamic UAV Replanning: Intuitions and Performance for Display Formats," Proceedings of the Human Factors and Ergonomics Society, 54th Annual Meeting, 2010 (5 pages).

Smallman, Harvey S. et al., "Naive Realism: Folk Fallacies in the Design and Use of Visual Displays," Topics in Cognitive Science 3 (2011), Cognitive Science Society, Inc., 2010 (30 pages).

Smallman, Harvey S. et al., "Expertise, Spatial Ability and Intuition in the Use of Complex Visual Displays," Proceedings of the Human Factors and Ergonomics Society, 51st Annual Meeting, 2007 (5 pages).

Disessa, Andrea A., "Metarepresentation: Native Competence and Targets for Instruction," in Cognition and Instruction, 22(3), Lawrence Erlbaum Associates, Inc., pp. 293-331, 2004 (23 pages).

Hegarty, Mary et al., "Naïve Cartography: How Intuitions about Display Configuration Can Hurt Performance," Cartographica, vol. 44, Issue 3, 2009 (17 pages).

Lowe, Richard K., "Constructing a Mental Representation from an Abstract Technical Diagram," Learning and Instruction, vol. 3, Pergamon Press Ltd., 1993 (24 pages).

Moray, Neville, Harmen, "Flexible Interfaces Can Promote Operator Error," in Enhancing Industrial Performance: Experiences of the Human Factor, pp. 49-64, 1992, (12 pages).

International Bureau, "International Search Report and Written Opinion", issued in connection with PCT patent application No. PCT/US2014/030278, dated Oct. 13, 2014, 15 pages.

International Searching Authority, "Written Opinion", issued in connection with PCT patent application No. PCT/US2014/026024, dated Jul. 25, 2014, 7 pages.

International Searching Authority, "Search Report", issued in connection with PCT patent application No. PCT/US2014/026024, dated Jul. 25, 2014, 5 pages.

International Searching Authority, "Written Opinion", issued in connection with PCT patent application No. PCT/US2014/026045, dated Jul. 23, 2014, 7 pages.

(56) References Cited

OTHER PUBLICATIONS

International Searching Authority, "Search Report", issued in connection with PCT patent application No. PCT/US2014/026045, dated Jul. 23, 2014, 4 pages.
International Searching Authority, Invitation to Pay Additional Fees and where applicable protest fee, issued in connection with PCT patent application No. PCT/US2014/030278, dated Jul. 23, 2014, 5 pages.
International Searching Authority, Invitation to Pay Additional Fees and where applicable protest fee, issued in connection with PCT patent application No. PCT/US2014/025998, dated Jul. 23, 2014, 5 pages.
International Bureau, "International Preliminary Report on Patentability", issued in connection with PCT patent application No. PCT/US2014/026045, Sep. 15, 2015, 8 pages.
International Bureau, "International Preliminary Report on Patentability", issued in connection with PCT patent application No. PCT/US2014/026024, Sep. 15, 2015, 8 pages.
International Bureau, "International Preliminary Report on Patentability", issued in connection with PCT patent application No. PCT/US2014/025998, Sep. 15, 2015, 11 pages.
International Bureau, "International Preliminary Report on Patentability", issued in connection with PCT patent application No. PCT/US2014/030278, Sep. 15, 2015, 11 pages.
State Intellectual Property Office of China, "Notification of the First Office Action," issued in connection with Chinese Patent Application No. 201480013960.X, dated Mar. 20, 2017, 14 pages.
European Patent Office, "Extended European Search Report," issued in connection with European Patent Application No. 16193584.6, dated Feb. 9, 2017, 9 pages.
United States Patent and Trademark Office, "Final Office Action," issued in connection with U.S. Appl. No. 14/207,227, dated Feb. 10, 2017, 65 pages.
United States Patent and Trademark Office, "Non-Final Office Action," issued in connection with U.S. Appl. No. 14/207,227, dated Aug. 2, 2016, 61 pages.
State Intellectual Property Office of China, "Notification of the First Office Action," issued in connection with Chinese Patent Application No. 201480014836.5, dated May 3, 2017, 34 pages.
State Intellectual Property Office of China, "Notification of the First Office Action," issued in connection with Chinese Patent Application No. 201480013991.5, dated May 31, 2017, 10 pages.
State Intellectual Property Office of China, "Notification of the First Office Action," issued in connection with Chinese Patent Application No. 201480014886.3, dated Apr. 19, 2017, 46 pages.
European Patent Office, "Communication pursuant to Article 94(3) EPC," issued in connection with European Patent Application No. 14 723 169.0, dated Dec. 20, 2017, 6 pages.
European Patent Office, "Communication pursuant to Article 94(3) EPC," issued in connection with European Patent Application No. 14 719 953.3, dated Dec. 20, 2017, 6 pages.
State Intellectual Property Office of China, "Notification of the 2nd Office Action," issued in connection with Chinese Patent Application No. 201480013960.X, dated Dec. 1, 2017, 12 pages.
State Intellectual Property Office of China, "Notification of the Second Office Action," issued in connection with Chinese Patent Application No. 201480014886.3, dated Jan. 16, 2018, 26 pages.
Japanese Patent Office, "Notice of Reasons for Rejection," issued in connection with Japanese Patent Application No. 2016-502030, dated Jan. 16, 2018, 3 pages.
Japanese Patent Office, "Notice of Reasons for Rejection," issued in connection with Japanese Patent Application No. 2016-502038, dated Jan. 30, 2018, 3 pages.

\* cited by examiner

| Heater Events | | | | |
|---|---|---|---|---|
| Date/Time ▽ | Event | Unit/Parameter | Status/Impact | Action |
| 2/1/2011 14:39 | Switched to Manual Mode | Fuel Oil Flow to H-138 (C-FIC-13803) | | Acknowledged |
| 2/1/2011 16:08 | Temp Lo | H-138 Flue Gas Temp (C-TI-13817) | | Call to maintenance |
| 2/1/2011 16:12 | Drop in Desalter Pressure | Desalter Pressure (C-PIC-13802) | | Reviewed last maintenance record |
| 2/1/2011 16:35 | Hot Crude Charge Lo-Lo | Hot Crude Charge to H-138 Flow (C-FIC-10128) | | |
| 2/1/2011 16:35 | Pump Started | Pump (P-129A) | | |

FIG. 33

SYSTEMS AND METHODS TO GRAPHICALLY DISPLAY PROCESS CONTROL SYSTEM INFORMATION

RELATED APPLICATION

This patent is a non-provisional of U.S. Provisional Application Ser. No. 61/793,282 which was filed on Mar. 15, 2013 and is hereby incorporated herein by reference in its entirety.

FIELD OF THE DISCLOSURE

This disclosure relates generally to process control systems and, more particularly, to systems and methods to graphically display process control system information.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controller is usually made available over a data highway or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process of a process control system, such as viewing the current state of the process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

These hardware devices typically include one or more operator interface displays to display pertinent information regarding the operating state(s), condition(s), and/or characteristic(s) of the control system(s), the devices within the control system(s), and/or process variables associated with the devices in the control system(s). Example displays include piping and instrumentation diagrams (P&IDs) that represent the equipment and other components within the process control system, alarm displays that receive and/or display alarms generated by controllers or devices within the process control system, control displays that indicate the operating state(s) of the controller(s) and other device(s) within the process control system, diagnostic displays that provide detailed information regarding the current state and/or historical values for key parameters associated with components in the process control system, etc.

SUMMARY

Systems and methods to graphically display process control system information are disclosed. Some example methods include monitoring process variables in a process control system, determining a current state of a first one of the process variables, and determining a trend associated with the first process variable. Some such examples further include generating a first graphic representative of information associated with the first process variable, the information comprising the current state of the first process variable and the trend of the first process variable. Some example methods also include rendering the first graphic via a display.

Some example instructions, when executed, cause a machine to at least monitor a process variable in a process control system, generate an icon indicative of information associated with the process variable, the information comprising a current state of the process variable and a trend of the process variable, and render the icon via a display.

Some example apparatus include a processor to monitor a process variable in a process control system and to generate an icon to graphically represent a current state of the process variable and a projected state of the process variable. Some such example apparatus further include a display to render the icon via an operator interface.

BRIEF DESCRIPTION OF THE DRAWINGS

FIG. 33 illustrates an example event history table for display by the example operator station of FIG. 2.

DETAILED DESCRIPTION

Figure 1:
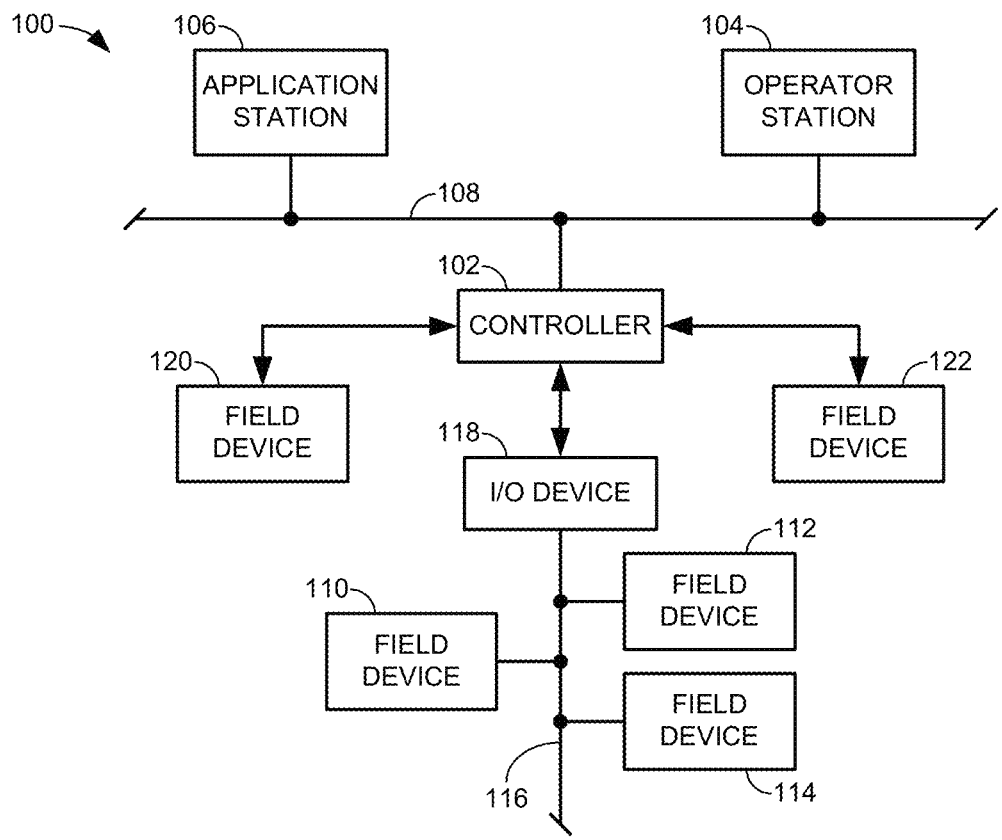
FIG. 1 is a schematic illustration of an example process control system.

Many plants in the process industry represent a capital investment of many hundreds of millions of dollars. Achieving the desired return on investment in a plant depends heavily on consistently achieving the production targets that were the basis of the plant design. The people within a plant who are ultimately responsible for the minute-to-minute operations are the plant operators. Operators insure correct plant operation in one or more process areas under all processing conditions. An operator is responsible for changing area production rates to achieve planned production targets. To meet planned targets, operators monitor process operations and make adjustments to maintain correct operating conditions and scheduled production levels. To successfully perform the functions of an operator, operators must have a thorough understanding of the process and its physical layout. To achieve this level of understanding, plant operators often have many years of experience with the process they oversee.

The operational scope of an operator varies depending on the process complexity, the number of pieces of equipment within each process area, and the degree of automation that is provided by the process control system. Operators normally interface with processes through control system software applications via an operator station or workstation containing one or more monitors or display devices to render graphical interfaces. Typically, control system software is designed to be highly customizable and configurable (both in terms of the processes that are specified, and how the processes are graphically represented) because most plants have different processes, process configurations, plant organizations and sets of requirements. Indeed, control system suppliers frequently market their software as highly customizable and/or configurable because such features are appealing to a broad market of potential customers across diverse domains without the suppliers having to provide elucidating explanations of the software and/or designing to the idiosyncrasies of each domain. Additionally, customizable and configurable control systems appeal to operators and other plant personnel (collectively herein referred to as operators) because graphical interfaces can be tailored to preference and functionality corresponding to particular process operations can be placed at the center of focus.

However, there are subtle but potentially important downsides to completely configurable user interfaces for plant operation. First, user-configurable interfaces are premised on the notion that users know what is good for them or, in technical parlance, that operators possess metarepresentational competence. However, recent research has suggested that this is not necessarily true. For example, studies have shown that people exhibit a misplaced faith in their ability to parse and use complex visual displays that are more "true to life" when task-irrelevant realism can actually slow task performance. Additionally, such a preference for realism is not only limited to spatial realism (e.g., "true to life" graphical displays with 3D perspectives) but can arise out of temporal realism (e.g., instant replay and real-time updating displays). Furthermore, other studies show that individuals with low spatial ability may be particularly prone to these misconceptions.

A second challenge presented by user-configurable interfaces is that users often underestimate the difficulty that others may have in interpreting their idiosyncratic user interface configuration and coding schemes. In process control settings, plant operation generally involves several operators working together at, and between, multiple displays. In such a setting, some studies suggest that operators may underestimate both how difficult it is for others to extract information from their personal user interface configuration when they call others over for assistance, and how difficult it is to extract information from it themselves. Furthermore, the circumstance where asking for assistance from another operator arises is likely to be when faced with critical issues when a quick, accurate understanding of plant status information is most important.

A third difficulty presented by user-configurable interfaces related to the first point above concerning a misconceived desire for realism is that realistic displays provide superficial details consistent with novice level understanding of processes but fail to support expert level functional understanding of processes. For example, real-time updating (temporally-realistic) in a "realistic" piping & instrumentation diagram (P&ID) display (e.g., a display that mimics plant engineering diagrams) does not support the extraction of task-relevant temporal trends. Rather, such displays force operators to rely either on mental integration of display data across time or on spatial integration of display data across separately provided charts, graphs, and/or trend windows. That is, when operators are limited to the current state (e.g., the current value and an indication of any corresponding alarms updated in real-time) of a process variable, there is the potential for operators to miss changes to the parameter values and/or fail to recognize a trend associated with the changing value over time. Additionally, providing real-time values of parameters does not provide an explicit indication of the relationship to corresponding set points or target values such as whether a parameter is low or high, how much difference there is between the parameter value and a set point, and/or how significant the difference is between the values (e.g., whether a large difference is indicative of the parameter approaching an alarm limit or indicative of a broad range of values within the normal operating state for the parameter). Even if a set point value is provided alongside a parameter value, each of these indicators of the condition and/or status of the parameter still require mental effort and/or calculations by an operator and/or require the operator to open up new windows and/or to navigate to different screens and drill down and/or sift through significant amounts of data to locate the desired information in a spatially-dispersed, disorganized layout instead of a consistent, tightly organized layout. Systems that rely on the mental efforts of operators are prone to errors, and systems that provide the information in other formats via different screens, pop-up windows, faceplates, etc., are inefficient to quickly review and compare relevant information and/or relate one piece of information in context with other information displayed on screen. Thus, many known process control systems result in slow and/or error-prone problem detection and identification.

A fourth potential downside to user-configurable interfaces that stems from the previous challenges is that, if given the option, users are likely to make configurable displays overly complex. With significant latitude in configuring a display to desired preferences, operators are able, and studies have shown are likely, to inundate P&ID displays with variables, each dispersed across the interface in a different location, from unit to unit, and color-coded with a rationale only apparent to the operator. The teachings disclosed herein provide systems, methods, and articles of manufacture to alleviate some of these obstacles by coding salient characteristics, conditions, trends, and/or other information within simple graphics that can be consistently used throughout a user interface and/or grouped at a single location within a display to enable operators to quickly assess the state of individual parameters and how they relate to each other to assess and overall state of an operating process. More particularly, the teachings disclosed herein enable the graphical encapsulation of process variable trend graphs into iconic symbols in which the icon design matches the task-relevant aspects of the trends (and related information) to their salience in the coding of the visual attributes of the icons. In this manner, operators can proactively monitor controlled processes and spot deviations from normal operating conditions before the deviating conditions trip alarms because the deviations are emphasized in salience in the icon design.

FIG. 1 is a schematic illustration of an example process control system 100 within which the teachings of this disclosure may be implemented. The example process control system 100 of FIG. 1 includes one or more process controllers (one of which is designated at reference numeral 102), one or more operator stations (one of which is designated at reference numeral 104), and one or more application stations or workstations (one of which is designated at reference numeral 106). The example process controller 102, the example operator station 104 and the example workstation 106 are communicatively coupled via a bus and/or local area network (LAN) 108, which is commonly referred to as an area control network (ACN).

The example operator station 104 of FIG. 1 allows an operator, engineer, and/or other plant personnel (referred to herein as an operator) to review and/or operate one or more operator display screens and/or applications that enable the operator to navigate between various displays and/or diagrams (e.g., a P&ID) representative of one or more components (e.g., a process site, a process area, a process unit, an equipment module, a control module, etc.) of the example process control system 100 and to determine the current and projected states of process variables corresponding to the components of the example process control system 100 being displayed. Additionally, as will be described in greater detail below, the operator applications also enable operators to assess and visualize other conditions, characteristics and/or information associated with the process variables associated with the corresponding components of the example process control system 100. An example manner of implementing the example operator station 104 of FIG. 1 is described below in connection with FIG. 2. Example operator display applications that may be used to implement the example operator station 104 are described below in connection with FIGS. 3 and 30-32.

The example operator station 104 includes and/or implements an operator interface (e.g., the example operator interface 300 of FIG. 3) to graphically display a process diagram (e.g., a P&ID) representative of one or more components of the example process control system 100. The operator interface also generates graphical and/or iconic symbols (referred to herein as icons) that concisely indicate, in a visually intuitive manner, various conditions, characteristics, trend information, and/or other information corresponding to process variables associated with elements representative of the displayed components. For instance, in some examples, the icons may indicate any of a current state of a process variable, a projected state of the process variable, a corresponding trend of the process variable, a direction of change of the process variable, a rate of change of the process variable, a relative position of the process variable with respect to the set point (e.g., above, below, or approximately at the set point), a relative deviation of the process variables from the set point with respect to an operational range of values for the process variable, a relative distance of the process variable with respect to an alarm limit, or an actual value of the process variable, set point, and/or alarm limits, among other information as will be described in greater detail below. In some examples, at least some of the above characteristics or attributes of a process variable may be visually mapped within the graphical nature of the icon while the other characteristics or attributes are not directly mapped in a visual manner but are nevertheless inferentially perceived from the corresponding icon.

In some examples, the operator interface provides a navigation pane to enable operators to quickly assess the relationship of the components displayed with other components in the example process control system 100 and/or to navigate to any of the other components in the example process control system that are of interest to be displayed via the operator interface. Furthermore, in some examples, the operator interface of the example operator station 104 provides a process variable summary pane that may display the graphics associated with the process variables corresponding to one or more of the displayed components of the example process control system 100 as a group for easy comparison. Additionally, the process variable summary pane may display the graphics with varying levels of detail to indicate more or less information as desired by an operator.

The example workstation 106 of FIG. 1 may be configured as an application station to perform one or more information technology applications, user-interactive applications and/or communication applications. For example, the workstation 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hard-wired and/or wireless Ethernet communication scheme. However, as will be readily appreciated by those having ordinary skill in the art, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112 and 114 via a data bus 116 and an input/output (I/O) gateway 118. The smart field devices 110, 112, and 114 may be Fieldbus compliant valves, actuators, sensors, etc., in which case the smart field devices 110, 112, and 114 communicate via the data bus 116 using the well-known Foundation Fieldbus protocol. Of course, other types of smart field devices and communication protocols could be used instead. For example, the smart field devices 110, 112, and 114 could instead be Profibus and/or HART compliant devices that communicate via the data bus 116 using the well-known Profibus and HART communication protocols. Additional I/O devices (similar and/or identical to the I/O gateway 118 may be coupled to the controller 102 to enable additional groups of smart field devices, which may be Foundation Fieldbus devices, HART devices, etc., to communicate with the controller 102.

In addition to the example smart field devices 110, 112, and 114, one or more non-smart field devices 120 and 122 may be communicatively coupled to the example controller 102. The example non-smart field devices 120 and 122 of FIG. 1 may be, for example, conventional 4-20 milliamp (mA) or 0-24 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by an operator using the operator station 104 and which have been downloaded to and/or instantiated in the controller 102.

While FIG. 1 illustrates an example process control system 100 within which the methods and apparatus to control information presented to process control system operators described in greater detail below may be advantageously employed, persons of ordinary skill in the art will readily appreciate that the methods, systems, and apparatus to control information presented to operators described herein may, if desired, be advantageously employed in other process plants and/or process control systems of greater or less complexity (e.g., having more than one controller, across more than one geographic location, etc.) than the illustrated example of FIG. 1.

Figure 2:
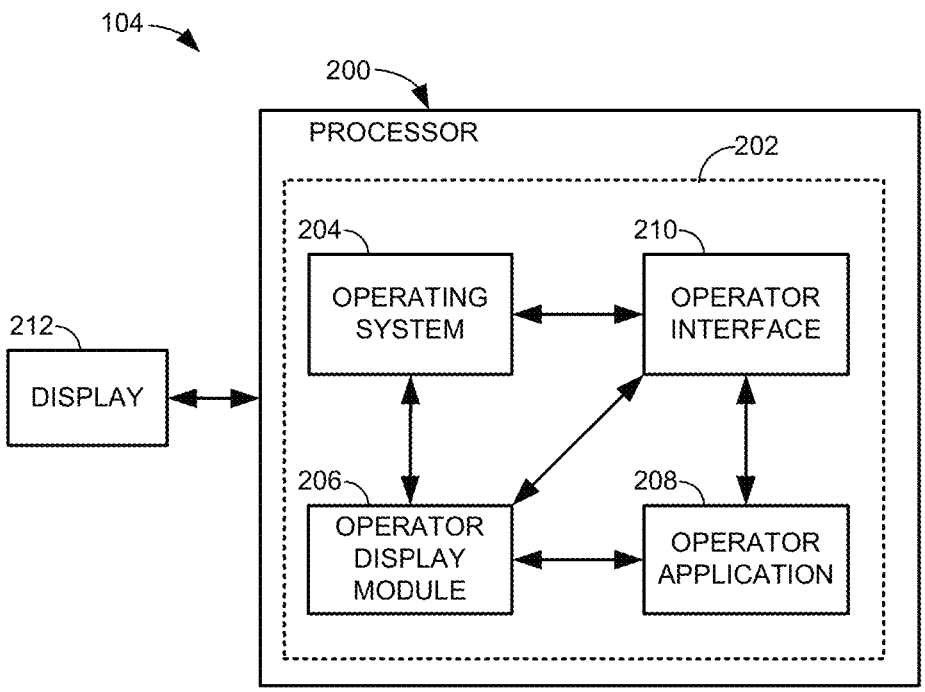
FIG. 2 illustrates an example manner of implementing the example operator station of FIG. 1.

FIG. 2 illustrates an example manner of implementing the example operator station 104 of FIG. 1. While the following description is provided with respect to the operator station 104, the example manner of implementing the example operator station 104 may also be used to implement the example workstation 106 of FIG. 1. The example operator station 104 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may execute, among other things, an operating system 204, an operator display module 206, an operator application 208, and an operator interface 210. An example operating system 204 is an operating system from Microsoft®. The example main memory 202 of FIG. 2 may be implemented by and/or within the processor 200 and/or may be one or more memories and/or memory devices operatively coupled to the processor 200.

To allow an operator to interact with the example processor 200, the example operator station 104 of FIG. 2 includes any type of display 212. Example displays 212 include, but are not limited to, a computer monitor, a computer screen, a television, a mobile device (e.g., a smart phone, a Blackberry™ and/or an iPhone™), etc. capable of displaying user interfaces and/or applications implemented by the processor 200 and/or, more generally, the example operator station 104.

The example operating system 204 of FIG. 2 displays and/or facilitates the display of user interfaces (e.g., the operator interface 210) by and/or at the example display 212. To facilitate operator interactions with applications implemented by the example operator station 104, the example operating system 204 implements an application programming interface (API) by which the example operator display module 206 can define and/or select the operator interface 210 via the operator application 208, and cause and/or instruct the operating system 204 to display the defined and/or selected operator interface 210. An example operator interface 210 is described below in connection with FIGS. 3 and 30-32.

To present process control system operator displays and/or applications, the example operator station 104 of FIG. 2 includes the example operator display module 206. The example operator display module 206 of FIG. 2 collects data from one or more process controllers (e.g., the example controller 102 of FIG. 1) and/or other elements of a process control system, and uses the collected data to create and/or define a particular operator interface 210 (e.g., the example operator interface 300 of FIGS. 3 and 30-32) via the operator application 208. The created and/or defined display is rendered at the example display 212 by and/or via the example operating system 204. The example operator display module 206 also receives operator inputs via the operator interface 210 (e.g., in response to the operator selecting, adjusting and/or operating elements of the operator interface 210) to update the operator interface 210 via the operator application 208.

While an example manner of implementing the example operator station 104 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 204, the example operator display module 206, the example operator application 208, the example operator interface 210, and/or, more generally, the example operator station 104 of FIG. 2 may be implemented by hardware, software, firmware and/or any combination of hardware, software and/or firmware. Thus, for example, any of the example operating system 204, the example operator display module 206, the example operator application 208, the example operator interface 210, and/or, more generally, the example operator station 104 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the example operator station 104 may include additional elements, processes and/or devices instead of, or in addition to, those illustrated in FIG. 2, and/or may include more than one of any or all of the illustrated data structures, elements, processes and devices.

Figure 3:
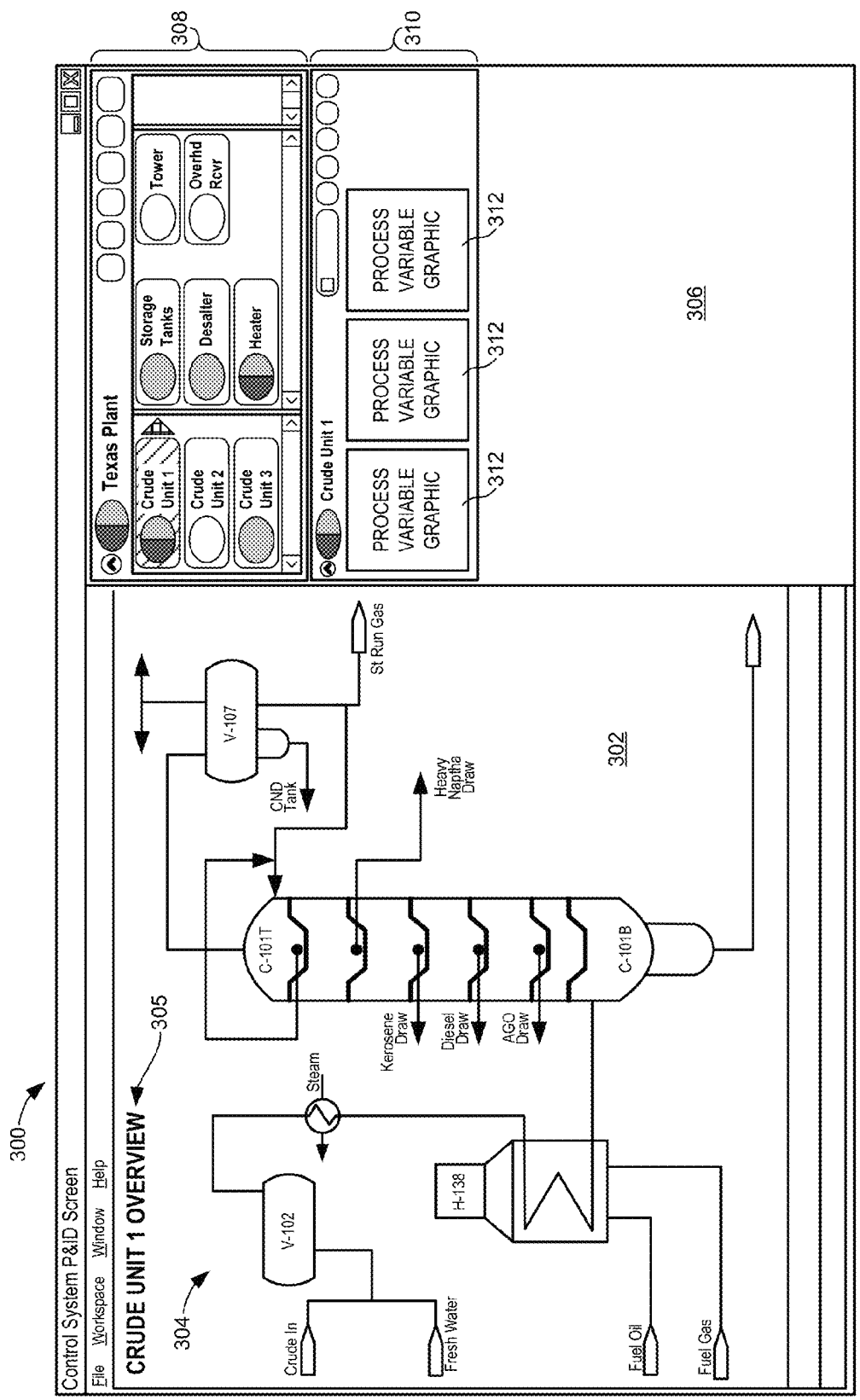
FIG. 3 illustrates an example operator interface that may be used to implement the operator application of the operator station of FIG. 2.

FIG. 3 illustrates an example operator interface 300 that may be used to implement the operator application 208 of the operator station 104 of FIG. 2. The example operator interface 300 of FIG. 3 includes an example piping and instrumentation diagram (P&ID) display area 302. The P&ID display area 302 contains a process diagram or image 304 of various elements representative of equipment, processes, process variables and/or components, and their relationships within a process control system (e.g., the example process control system 100 of FIG. 1). In some examples, the P&ID display area 302 includes a title 305 to indicate what component(s) of the process control system are represented by the process diagram 304 relative to the rest of the process control system. For instance, in the illustrated example, the title 305 indicates the process diagram 304 corresponds to an overview of a particular process unit (labeled "Crude Unit 1") within the process control system. In some examples, the application associated with the operator interface 300 may generate and display different process diagrams 304 within the P&ID display area 302 corresponding with different components and/or subcomponents of the process control system at various levels within a hierarchy of components defining the process control system (e.g., a particular site or plant, area, unit, module, etc.).

Additionally, the example operator interface 300 of FIG. 3 is provided with an example sidebar 306 to help operators quickly assess the condition of the process control system by: (1) identifying the relationship(s) of the current view in the P&ID display area 302 (e.g., current process diagram 304) with the rest of the process control system, (2) identifying any issues (e.g., alarms, projected alarms, etc.) that may require attention and their relative severity to enable operators to prioritize their actions; (3) identifying the relationship(s) of the identified issues and their corresponding components with the rest of the process control system and/or with the current view in the P&ID display area 302, and (4) providing various levels of information associated with the process control system so that operators have the data they need to respond to the issues and or perform relevant tasks without having to sift through or be inundated with information unnecessary to the task at issue. In particular, the example sidebar 306 of the illustrated example may include a navigation pane 308 that enables operators to determine the relationships of the component(s) and/or related issues in the process control system represented by the currently displayed process diagram 304 with the rest of the process control system. Example navigation panes are described in greater detail below in connection with FIGS. 26-29. In some examples, the sidebar 306 also includes a process variable summary pane 310 that provides graphics 312 corresponding to specific process variables associated with one or more of the components of the process control system represented within the P&ID display area 302. The graphics 312 may be selected by operators with varying degree of detail to provide the operators with the desired level of information to appropriately assess the condition of the process variable(s) and/or take any suitable action as the need may arise. For example, at a basic or cursory level, the graphics 312 may provide sufficient information to enable operators to generally supervise the conditions of the process variables and identify issues. At a mid-level, the graphics 112 may provide further information to enable operators to monitor and control the process control system, troubleshoot identified issues and/or analyze the conditions of the process variables and corresponding portions of the process control system. At a detailed or comprehensive level, the graphics 112 may provide further information relating to the relevant history of the process variables leading to a current time, project or forecast the condition of the process variables in a future state, integrate critical events and/or triggers (e.g., alarms) from an event log into the identified temporally based trends to enable operators to understand the issues in context with changing circumstances and/or diverse aspects of the process control system. Example graphics and associated process variable summary panes are described in greater detail below in connection with FIGS. 4-25. In some examples, where screen size and/or resolution is constrained, such as, for example, on a display screen of a portable handheld device (e.g., smart phone, tablet, etc.), the sidebar 306 may be rendered via the screen without the corresponding P&ID display area 302. Further in some such examples, only a portion of the sidebar 306 may be displayed at any given time along with the ability to scan (e.g., scroll) to any portion of interest. In other examples, only one of the navigation pane 308 or the process variable summary pane 310 are displayed via such display devices.

Figure 4:
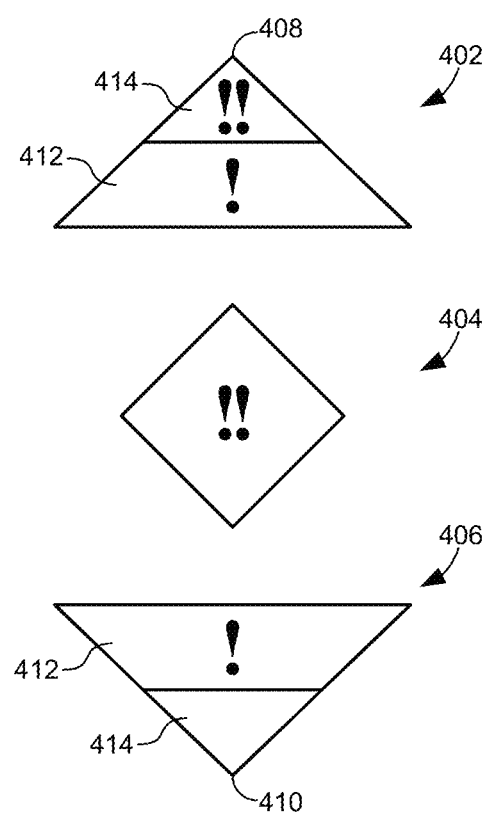
FIGS. 4-17 illustrate example icons to indicate conditions, characteristics, trends, and/or other information associated with process variables corresponding to components within the example process control system of FIG. 1.

FIG. 4 illustrates example icons 402, 404, 406 to indicate conditions, characteristics, trends, and/or other information associated with a process variable of a process control system (e.g., the example process control system 100 of FIG. 1). Specifically, in the illustrated example of FIG. 4, the characteristics and/or conditions emphasized by the icons 402, 404, 406 include a current state of a process variable, a projected state of the process variable, and a corresponding trend (e.g., direction) of the process variable, which are represented by the shape, orientation, and notations on the icons 402, 404, 406 in the illustrated example. For example, the icon 402 is triangular in shape with a peak 408 pointing upwards to visually indicate an upward trend of the process variable. By comparison, the icon 406 is also triangular in shape but with a peak 410 pointing downwards to visually indicate a downward trend of the process variable. The characteristic of the shapes of icons described herein to indicate a direction or trend of corresponding process variables is referred to herein as the trend identifying shape of the icons.

Additionally, the icons 402, 406 each contain two sections: (1) a current state section 412 that is opposite the peaks 408, 410 to visually indicate the current state of the process variable and (2) a projected state section 414 that is adjacent the peaks 408, 410 to visually indicate the projected state of the process variable. The icon 404 of FIG. 4 is in a generally diamond or rhombus shape (or any other suitable shape) to be distinguishable from the triangular shapes of the icons 402, 406 to visually indicate that the process variable is maintaining its present state (e.g., there is no trend upwards or downwards). The current state sections 412 and the projected state sections 414 of the icons 402, 404 are positioned in a stacked manner corresponding to the direction the process variable is trending (e.g., the direction the peaks 408, 410 are pointing). As used herein, the term "state" of a process variable corresponds to the operating state of the variable with respect to its set point and/or any alarm limits. For example, if a process variable is operating within allowable limits, the "state" of the process variable would be normal or as expected or as desired. However, if the process variable has exceeded a high alarm limit, then the state of the process variable would be a high alarm state. Similarly, the state of an alarm may be a low alarm state if the process variable drops below a corresponding low alarm limit. In some situations, a process variable may be associated with multiple alarm limits set at different values corresponding to varying levels of seriousness or criticality (e.g., a high alarm limit and a high-high alarm limit).

In the illustrated example, the current and projected states of a process variable are visually indicated in the icons 402, 404, 406 by a textual notation or other visual indicia within the corresponding current state and projected state sections 412, 414. For example, as shown in FIG. 4, a single exclamation point is indicative of the process variable in an operating state (e.g., the current state section 412 in the icon 402) corresponding to a first alarm state associated with a range of values for the process variable outside normal operating conditions (e.g., the process variable drops below a low alarm limit or rises above a high alarm limit). A double exclamation point is indicative of the process variable passing a second alarm limit (e.g., the process variable drops below a low-low alarm limit or rises above a high-high alarm limit) into a corresponding low-low alarm state or a high-high alarm state (e.g., the projected state section 414 in the icon 402). Additional exclamation points and/or other notations may be provided to indicate other operating states associated with the process variable (e.g., passing a third alarm limit). No exclamation point shown (e.g., the projected state section 414 of the icon 406) is indicative of the process variable operating within normal operating conditions.

The icon 404 of the illustrated example is not divided into sections because the icon 404 indicates that the corresponding process variable is being maintained in a specific state (e.g., it is not trending upwards or downwards to change states). Put another way, the current state and the projected state of the process variable are the same. Accordingly, only a single notation (e.g., a single set of double exclamation points) is represented within the icon 404 to indicate the corresponding state within which the process variable is being maintained (e.g., it is remaining steady in a high-high alarm state).

Visually representing the current state, the projected state, and the associated trend as described above enables an operator to quickly and intuitively assess conditions associated with a process variable including the current state of the process variable as well as a projected state. In this manner, an operator can anticipate when a process variable is approaching an alarm limit to proactively take measures to resolve the situation even before the alarm is tripped. Furthermore, even if the process variable is operating within an alarm state outside a desired range of values, visually indicating current and projected state characteristics associated with the process variable enables the operator to quickly recognize the qualitative status of the trend (e.g., whether the state of the process variable is improving (moving towards the set point) or worsening (moving away from the set point)). In a similar manner, where a process variable is bounded by alarm limits on a single side (e.g., either high limits or low limits), the current and projected states can serve to identify the direction or trend in which the value of the process variable is moving. However, where a process variable is bounded on both sides (e.g., has both upper and lower alarm limits) the trend of the process variable may not be immediately apparent based only on the current and projected states. Accordingly, the icons 402, 406 of FIG. 4 are shaped like triangles to point in the direction in which the process variable is trending as is shown and described in greater detail in FIG. 5.

Figure 5:
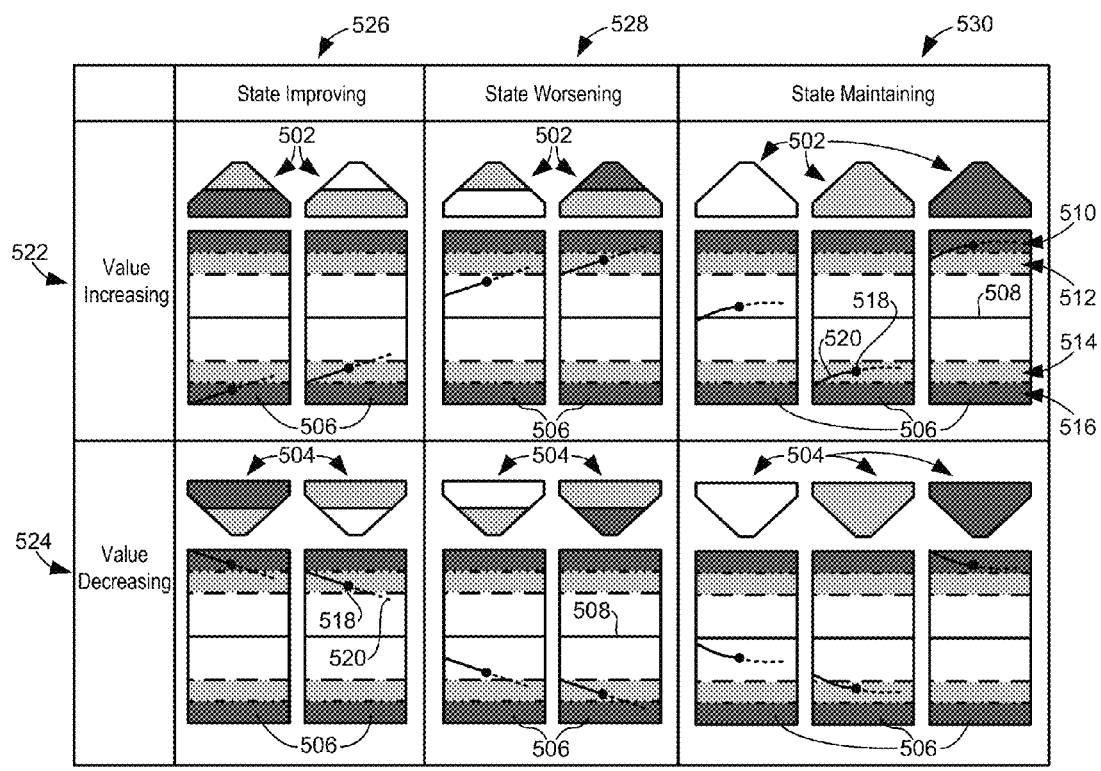
Figure 6:
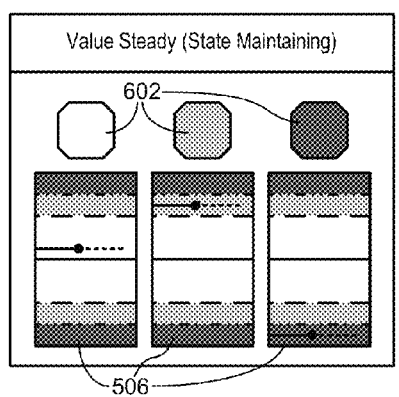
Figure 7:
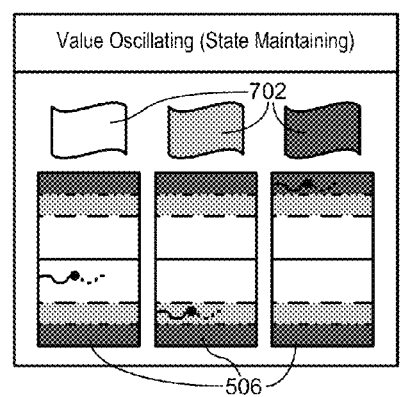

FIGS. 5-7 illustrate other example icons 502, 504, 602, 702 to indicate the conditions, characteristics, trends, and/or information associated with a process variable as described above in connection with FIG. 4. Specifically, the example icons of FIGS. 5-7 emphasize current and projected states of a process variable, and the direction of the process variable. The example icons 502 of FIG. 5 are similar to the icon 402 of FIG. 4 in that the icons 502 are generally triangular in shape and point upward to indicate an upward trend of the process variable. The example icons 504 of FIG. 5 are also similar to the icon 406 of FIG. 4 in that the icons 504 are generally triangular in shape and point downward to indicate a downward trend of the process variable. Furthermore, while the icons 402, 406 of FIG. 4 include exclamation points to indicate the current and projected state of the corresponding process variables, the current and projected states in the icons 502, 504 are represented by the shading (e.g., flood fill) of the corresponding current and projected state sections. Other methods of indicating the operating states of the process variables may alternatively be used including different patterns, colors, shading, shapes, sizes, outlines, textual or symbolic notations, flashing, highlighting, etc. For example, a normal operating state may be indicated by a gray color, a low or high alarm state (relatively low criticality) may be indicated by a yellow color, and a low-low or a high-high alarm state (relatively high criticality) may be indicated by a red color. Further, in such examples, the background or surrounding color may be indicated by a gainsboro color (e.g., a light bluish gray). More generally, the color scheme implemented in some examples is specified in industry standard perceptual color discrimination spaces (e.g., International Commission on Illumination (CIE) standards). An advantage of such a color scheme is that the colors may be distinguishable by color anomalous (e.g., color blind) as well as normal (e.g., non-color anomalous) operators. In the illustrated examples of FIG. 5 and throughout the following figures, the high criticality states (e.g., low-low or high-high alarm states) are represented with dark shading, the low criticality states (e.g., low or high alarm states) are represented with light shading, and the normal operating state is represented with no shading (e.g., white).

For purposes of explanation, the icons 502, 504 are shown above corresponding process variable graphs 506 that indicate an example value of the process variable over time. Each graph 506 shows a set point or target value (indicated by the centerline 508) at which the process variable is to operate under normal conditions and two levels of high and low alarm states or ranges (referred to herein as a high-high alarm state 510, a high alarm state 512, a low alarm state 514, and a low-low alarm state 516) delineated by hashed lines corresponding to alarm limits and distinguished with different shading associated with the severity of the corresponding alarm state. The state of a process variable within the area between the high and low alarm states 512, 514 is referred to herein as the normal or target operating state. Additionally, each graph includes a dot 518 representative of the current value of the process variable disposed along a line 520. The solid portion of the line 520 is representative of the value of the process variable over time leading up to the current value. The dotted portion of the line 520 is an extrapolation of the solid portion of the line 520 to represent the projected value of the process variable going forward in time. Additionally or alternatively, other icons (or variations on the icons 502, 504 shown in FIG. 5) may be used to represent corresponding process variables changing in other manner over time not shown by the graphs 506 (e.g., a steeper trend line 520 that crosses over the set point).

As shown in FIG. 5, the icons 502 are placed in a row 522 associated with an increasing process variable (e.g., trending upwards) and the icons 504 are placed in a row 524 associated with a decreasing process variable (e.g., trending downwards). Based on the trend identifying shape of the icons 502, 504 (e.g., a generally triangular shape oriented to point up or down), an operator can easily identify the direction or trend of the process variable. Furthermore, in some such examples, based on the direction of the trend in conjunction with the ordering of the states indicated by the current and projected state sections, operators can infer the relative position of the process variable with respect to the set point and the qualitative status of the indicated trend (e.g., worsening or improving). For example, if the trend identifying shape indicates a downward trend and the projected state section indicates a worse alarm state than the current state section, operators can infer that the process variable is below the set point and dropping (i.e., getting worse). In contrast, if the trend identifying shape indicates an upward trend with the same current and projected states as in the above example, operators can infer that the process variable is above the set point and rising such that it is again worsening. In a similar manner, if the relative severity of the current and projected state sections of the icons are reversed from the above examples, operators can infer whether a process variable is above or below the set point and that it is qualitatively improving (i.e., moving towards the set point).

In the illustrated example of FIG. 5, the icons 502, 504 are grouped in separate columns 526, 528, 530 based on whether the state of the process variable is improving in that it is moving towards the set point (column 526), worsening in that it is moving away from the set point (column 528), or maintaining in that it is in a substantially constant or steady state condition (column 530). Within the improving column 526 and the worsening column 528 of the increasing row 522, FIG. 5 provides each possible icon 502 for each projected transition between states as the value of the process variable is projected to move from the low-low alarm region to the low alarm region, from the low alarm region to the normal operating state, from the normal operating state to the high alarm region, and from the high alarm region to the high-high alarm region. In the columns 526, 528 of the decreasing row 524, FIG. 5 illustrates each icon 504 corresponding to the reverse transitions from the high-high alarm range down through the low-low alarm range. As with the icons 402, 406 of FIG. 4, the current and projected state of the process variable associated with the icons 502, 504 of FIG. 5 are based on the visually distinguishable characteristic (e.g., shading or flood fill, patterns, colors, shapes, sizes, outlines, textual or symbolic notations, bordering, flashing, highlighting, etc.) of the current and projected state sections of the icons 502, 504.

Within the state maintaining column 530, the icons 502, 504 have the same generally triangular shape as the icons 502, 504 of the other columns 526, 528 (to indicate a direction of the trend associated with the process variable). However, in contrast with the icons 502, 504 in the columns 526, 528, the icons 502, 504 of the state maintaining column 530 are filled or shaded with a single color corresponding to a single state of the process variable. In this manner, an operator may recognize that while the process variable is either moving up (icons 502) or down (icons 504), the trend is evening out such that the projected state is the same as the current state. In some situations, the process variable may be substantially constant over time such that there is no trend up or down. Under such conditions, a different shape may be represented such as a generally octagonal shape as shown by the icons 602 of FIG. 6 with appropriate indicia (e.g., shading, patterns, colors, outlines, textual or symbolic notations, bordering, flashing, highlighting, etc.) to visually indicate the corresponding operating state of the process variable. The generally octagonal shape is provided because of its association with a stop sign to intuitively indicate the process variable is not changing (i.e., it has stopped). Additionally or alternatively, where the trend is oscillating or the trend is not otherwise clearly moving up, down, or maintaining a steady state, a different shape may be used to indicate such a condition of the process variable as shown by the shape of the icons 702 of FIG. 7. While certain shapes have been described in connection with FIGS. 4-7 to indicate various characteristics (e.g., current state, projected state, trend) other suitable shapes and their corresponding orientation may alternatively be used. For examples, an arrow or other shape that indicates direction may be used in place of the icons 402, 406 of FIG. 4 and the icons 502, 504 of FIG. 5.

Figure 8:
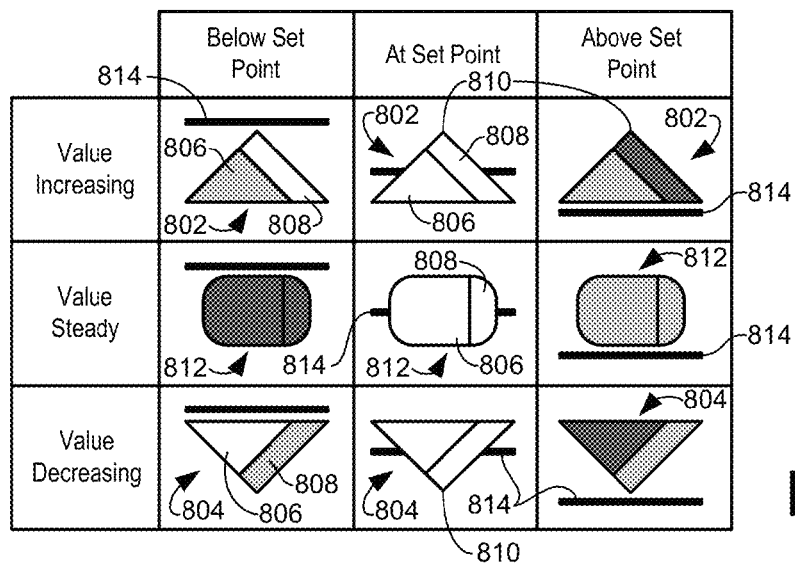
Figure 9:
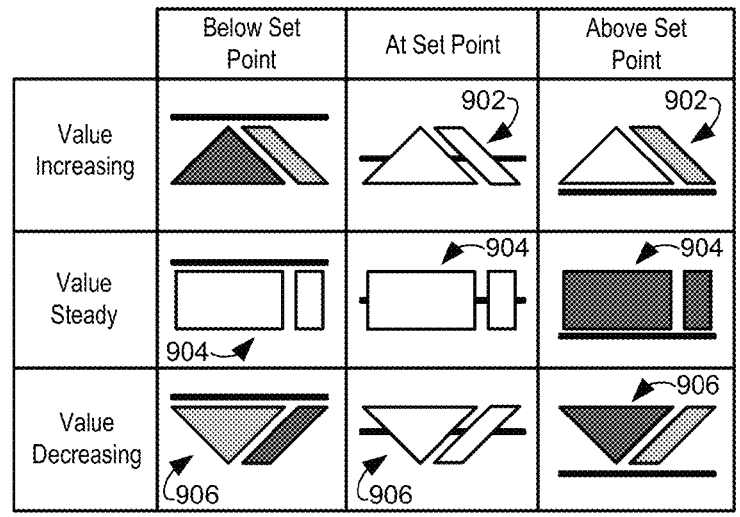
Figure 10:
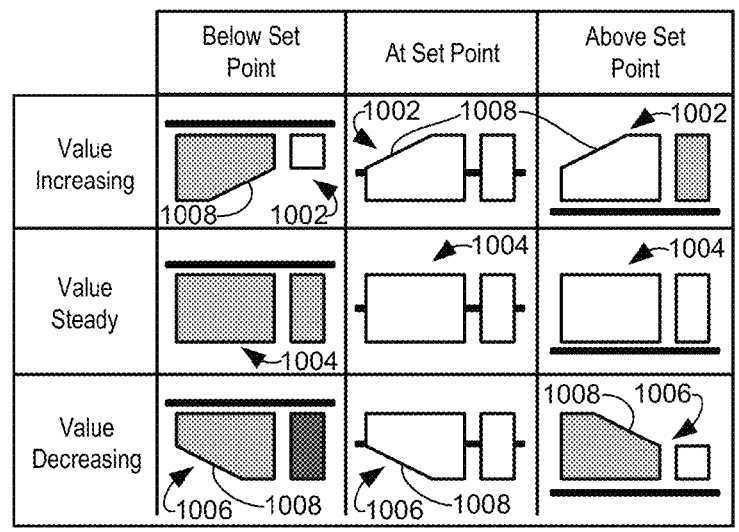

FIGS. 8-10 illustrate other example icons to indicate conditions, characteristics, trends, and/or other information associated with the process variable of the example process control system 100 of FIG. 1. In particular, the illustrated examples of FIGS. 8-10 show icons that emphasize current and projected states of a process variable, the direction of the process variable, and the relationship of the process variable to a set point associated with the process variable. FIG. 8 illustrates example triangular icons 802, 804 similar to the triangular icons 402, 406 of FIG. 4 except that the icons 802, 804 are divided into a current state section 806 and a projected state section 808 where the projected state section 808 extends along an edge adjacent a peak 810 of the triangular icons 802, 804. In this manner, the horizontal relationship of the sections 806, 808 (e.g., viewed from left to right) represents the change of state of the process variable over time. That is, the current state is indicated on the left (by the current state section 806) and the projected state (i.e., the state at a future point in time) is indicated on the right (by the projected state section 808). Additionally, the vertical relationship of the sections 806, 808 (e.g., viewed up or down in the direction pointed by the peak 810) represents the direction of the process variable. FIG. 8 also illustrates example steady state icons 812 having a generally rectangular shape. The steady state icons 812 also include two sections to provide consistency with the increasing and decreasing trend icons 802, 802 but each section 806, 808 has the same visual indicia of the operating state (e.g., shading, pattern, color, outline, textual or symbolic notation, bordering, flashing, highlighting, etc.) because a steady state implies that the projected state of an associated process variable is the same as the current state of the process variable. Accordingly, the example icons 802, 804, 812 of FIG. 8 provide the same information regarding the current and projected states of a process variable as well as the trend of the process variable as was described above in connection with FIGS. 4-7.

Additionally, the example icons 802, 804, 812 include a set point indicator 814 (e.g., a line) to indicate the relative position of the value of the process variable with respect to a set point associated with the process variable. For example, in the left hand column of FIG. 8 the set point indicator 814 in each of the corresponding icons 802, 804, 812 is positioned above the rest of the corresponding icon 802, 804, 812 (e.g., above the sections 806, 808) to indicate the process variable is below the set point. In this manner, an operator can recognize that the process variable represented by the increasing icon 802 is improving (i.e., moving towards the set point) while the process variable represented by the decreasing icon 804 is worsening (i.e., moving away from the set point) without having to mentally integrate the meaning of the shading in the current state section 806 and the projected state section 808 and the order in which the sections 806, 808 are stacked. Thus, whether a process variable is getting farther away or closer to its set point can be identified even if the current state and the projected state are the same. In a similar manner, as shown in FIG. 8, the set point indicator 814 is placed below the rest of the icons 802, 804, 812 to indicate the value of the process variable is above the set point, and the set point is positioned at the same level as the rest of the icons 802, 804, 812 to indicate when the value of the process variable is approximately at the set point. While FIG. 8 shows the set point indicator 814 behind the rest of the icons 802, 804, 810, in some examples, the set point indicator 814 is placed in front of (i.e., overlays) the rest of the icons 802, 804, 810.

FIG. 9 illustrates example icons 902, 904, 906 that function in the same way as the icons 802, 804, 810 of FIG. 8, except that the icons 902, 904, 906 have a different shape. In particular, the trend identifying shape (e.g., triangular shape) of the icons 902, 904, 906 to indicate the trend or direction of the process variable is exclusively associated with the current state of the process variable, while a separate section running along a side of the triangle serves to indicate the projected state of the process variable.

FIG. 10 illustrates yet other example icons 1002, 1004, 1006 similar to those described above in connection with FIGS. 8 and 9. In FIG. 10, the current state of the process variable is indicated by a generally rectangular shape with a chamfered-like edge 1008. In the illustrated example, the slope of the edge 1008 (moving from left to right) serves to indicate the direction of trend of the process variable over time. The icons 1004 of the illustrated example do not have a chamfered-like edge 1008, thereby indicating that the process variable is maintaining its current value. In some examples, the angle of the slope is indicative of the rate at which the value of the process variable is changing. The use of the edge 1008 provides an alternative trend identifying shape that does not point the direction of the trend like a triangle or arrow but is nevertheless intuitive because it is representative of a graph plotted over time.

While the example icons 802, 804, 810, 902, 904, 906, 1002, 1004, 1006 of FIGS. 8-10 provide some indication of the relative position of the process variable with respect to the set point (e.g., via the set point indicator 814 of FIG. 8), in some examples, in addition to the relative position of the process variable (i.e., above, below, or at the set point), it is desirable to indicate the relative deviation of the process variable from the set point with respect to an entire range of potential values for the process variable (e.g., how far above or below the set point). An indication of such a relative deviation of the process variable from the set point is provided in the illustrated examples of FIGS. 11-17 along with other indications of conditions, characteristics, trends, and/or other information associated with process variables described more fully below.

Figure 11:
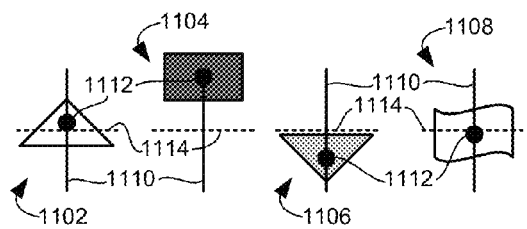

In particular, FIG. 11 illustrates example icons 1102, 1104, 1106, 1108 with shapes similar to those described above. For example, the triangles in icons 1102, 1106 indicate that the trend of the process variable is moving up or down, respectively. The rectangle in the icon 1104 indicates a steady state of the process variable, and the wavy rectangle in the icon 1108 indicates an oscillating or indeterminate pattern of the process variable. Further, the shading of each shape indicates the corresponding operational state (e.g., normal operating state, high alarm state, low alarm state, high-high alarm state, low-low alarm state, etc.) of the process variable as described above.

As shown in FIG. 11, each of the shapes is positioned at various points along an operational range indicator 1110 (e.g., the solid vertical line). In the illustrated example, the range indicator 1110 is representative of a range of potential values at which the process variable may operate and a process variable indicator 1112 (e.g., the central dot of each icon 1102, 1104, 1106, 1108) corresponds to the location or position of the process variable within the range represented by the line 1110. Thus, as is shown in the icon 1104, the process variable is nearly at the upper extremity of the range of potential values and, therefore, is shown with a pattern corresponding to a high-high alarm state. The dashed horizontal line in each icon 1102, 1104, 1106, 1108 is a set point indicator 1114 (e.g., a dashed line) representative of the set point relative to the range of potential values indicated by the range indicator 1110. Although the set point indicator 1114 is shown in FIG. 11 as approximately in the middle of the range indicator 1110, the set point indicator 1114 may be located at any location along the range indicator 1110 depending upon the value of the set point and the corresponding values associated with the range defined by the range indicator 1110. In this manner, an operator may immediately determine the relative position (e.g., above/below) of the process variable with respect to the set point as in FIGS. 8-9 but also visually assess the relative deviation of the process variable from the set point with respect to the extreme values of the process variable within an expected range of values for the process variable represented by the line 1110 to obtain a more accurate picture of the condition of the process variable.

Figure 12:
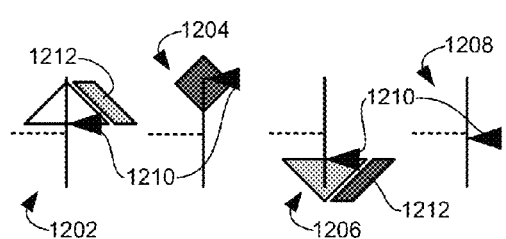

FIG. 12 illustrates example icons 1202, 1204, 1206, 1208 that correspond to the same states and corresponding trends as illustrated in the example icons 1102, 1104, 1106, 1108 of FIG. 11, respectively. However, the example icons 1202, 1204, 1206, 1208 include a process variable indicator 1210 that is an arrow head or pointer, instead of the dot 1112 of FIG. 11, to point the specific location of the process variable relative to the set point and the entire range of potential values for the process variable. Additionally, the example icons 1202, 1206 include a projected state section 1212 to explicitly indicate in a visual manner, the direction of the trend and the anticipated state of the process variable if the trend continues on its projected path without change.

Figure 13:
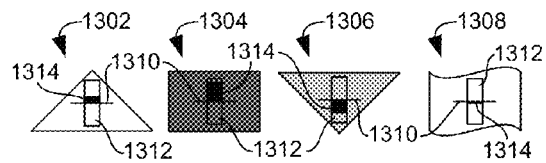

FIG. 13 illustrates other example icons 1302, 1304, 1306, 1308 that correspond to the same states and corresponding trends as illustrated in connection with the example icons 1102, 1104, 1106, 1108 of FIG. 11, respectively. Furthermore, as shown in the illustrated example, the icons 1302, 1304, 1306, 1308 of FIG. 13 are based on the same shapes as the example icons 1102, 1104, 1106, 1108 of FIG. 11. However, in the example icons 1302, 1304, 1306, 1308 of FIG. 13, a set point indicator 1310 (e.g., the central line) and an operational range indicator 1312 (e.g., the rectangular bar) are shown within the outer shape. The relative position and relative deviation of the process variable with respect to the set point and outer limits of potential values for the process variable is indicated by a black band that serves as a process variable indicator 1314 within the range bar 1312. In this manner, the icons 1302, 1304, 1306, 1308 remain stationary and can be larger and of a consistent size when used in an operator display as compared to the examples of FIGS. 11 and 12.

Figure 14:
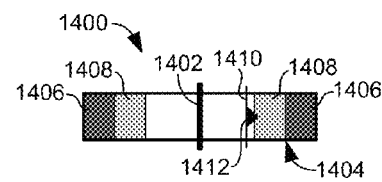

In addition to indicating the placement of a process variable within an overall range of potential values and relative to a set point, in some examples disclosed herein, the placement or relative distance of the value of the process variable with respect to one or more alarm limits may also be indicated (as shown in the illustrated examples of FIGS. 14-16 described in greater detail below). For example, FIG. 14 illustrates another example icon 1400 with a set point indicator 1402 (e.g., the central bar or line) located on an operational range indicator bar 1404. In the illustrated example, each end of the range indicator 1404 includes an outer (more critical) alarm section 1406 corresponding to a sub-range of values associated with a high-high alarm state or a low-low alarm state. Immediately within the outer alarm sections 1406 of the example icon 1400 is an inner alarm section 1408 corresponding to a high alarm state or a low alarm state while the remaining portion of the range indicator bar 1404 corresponds to a normal operating state. The relative position, deviation, and distance of the process variable with respect to the set point, alarm limits, and entire operational range (as well as the current state of the process variable) is indicated in the example icon 1400 by a process variable indicator line 1410 that may move along the range bar 1404. The trend or direction of the process variable and, therefore, the projected state of the process variable, is indicated by the direction in which an arrow marker 1412 is pointing along the range 1406.

Figure 15:
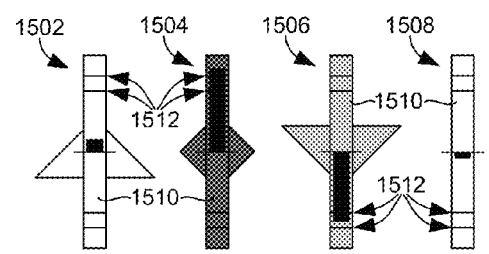

FIG. 15 illustrates other example icons 1502, 1504, 1506, 1508 having operational range indicator bars 1510 similar to the range indicator bars 1312 of the example icons 1302, 1304, 1306, 1308 of FIG. 13 except that the range indicator bars 1510 of FIG. 15 are substantially longer and extend beyond the trend identifying shapes associated with each of the example icons 1502, 1504, 1506, 1508. The longer range indicator 1510 provides a greater distance over which the range of potential process variable values is represented to provide greater precision or granularity in visually indicating the relative position, deviation, and/or distance of the process variable with respect to the set point, range, and/or alarm limits. Furthermore, as shown in the illustrated example, additional alarm limit indicators 1512 (e.g., lines) are included within the range indicator bar 1510 to represent the points on the range corresponding to alarm limits for the process variable (e.g., similar to the alarm sections 1406, 1408 of FIG. 14 described above).

Figure 16:
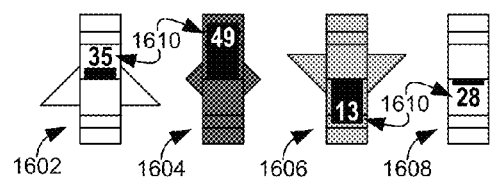

FIG. 16 illustrates other example icons 1602, 1604, 1606, 1608 that are similar to the example icons 1502, 1504, 1506, 1508 of FIG. 15 except that the icons 1602, 1604, 1606, 1608 include a textual notation 1610 identifying the actual value of the process variable. In other examples, the actual value of the set point and/or the alarm limits may also be indicated.

Figure 17:
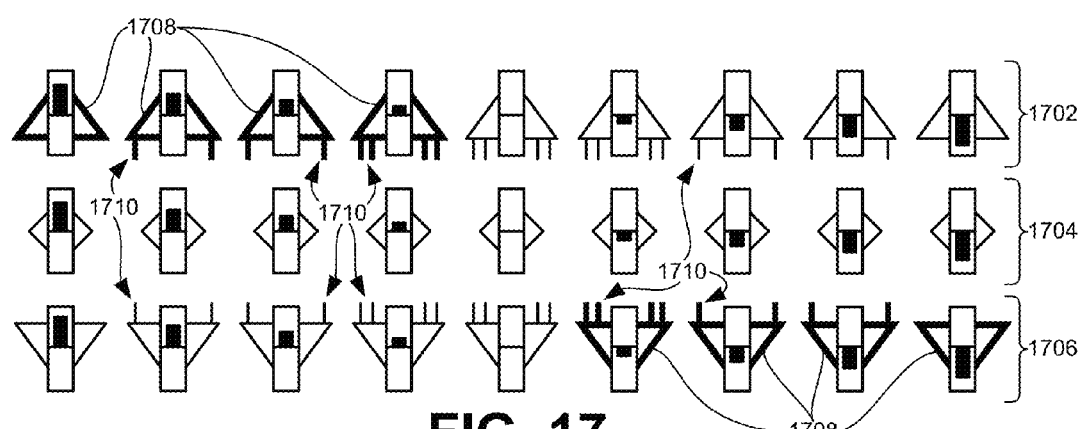

FIG. 17 illustrates a series of example icons 1702, 1704, 1706 similar to those of FIGS. 15 and 16 corresponding to a process variable at various locations along a range defined by a range indicator. For simplicity, different shading (e.g., flood fill) in the icons 1702, 1704, 1706 has been omitted but, in some examples, when being used would be shaded (or flood filled) in a similar manner as described above. In the four left-most increasing icons 1702, the process variable is shown above the set point (based on the position of the process variable indicator (e.g., the black band)) and the trend identifying shape of the icons 1702 is an upward pointing triangle. As a result, in the illustrated example, the four left-most icons 1702 are indicative of a worsening state (e.g., the process variable is trending away from the set point). This is similarly true for the four-right-most decreasing icons 1706. As shown in the illustrated example, the trend identifying shape (e.g., a generally triangular shape pointing up or down) associated with the icons 1702, 1706 in a qualitatively worsening state are represented with a thick border 1708 to capture the attention of an operator and/or enable the operator to quickly identify when a process parameter is worsening and, thus, may need corrective action. In other examples, the icons 1702, 1704 associated with a worsening state may be distinguished in any other suitable manner such as flashing, changing in color, size, intensity, pattern, orientation, etc.

Another characteristic associated with a process variable that can be beneficial to an operator is the rate or speed at which a process variable is changing. For example, if a process variable is rapidly approaching an alarm limit, an operator can benefit from this knowledge to know that action must be taken quickly to avert potential problems whereas if a process variable is trending towards an alarm limit, but at a modest pace, the operator may monitor the process variable to determine if it is corrected before taking action. Accordingly, in the illustrated example of FIG. 17, the rate of change of the value of a process variable is indicated by rate indicators 1710 (e.g., the lines or tails stemming from the trend identifying shape). In some examples, a greater number of rate indicators 1710 corresponds to a greater rate of change of the process variable. As is illustrated, the rate indicators 1710 may also be displayed as thick lines when the corresponding process variable is in a worsening state.

While the example icons describe above in connection with FIGS. 4-17 provide various visual indicia (e.g., shading, patterns, colors, shapes, sizes, lines, pointers, outlines, orientations, symbols, notations, bordering, flashing, highlighting, etc.) to convey the identified characteristics, trends, and/or conditions of corresponding process variables, other visual indicia and their appropriate orientation and composition may be used in addition to, or in place of, what is described above to convey the same characteristics and/or conditions. Furthermore, the visual indicia of the icons described above may be combined in different ways and/or be given different meanings from what is described herein to convey the desired information and enable the salient attributes to stand out to operators in an intuitive manner with relatively little mental effort and/or time on the part of the operators. The intent of the visual indicia of the example icons described herein increase the efficiency of operators while reducing the potential for errors. Additionally, the different icons and corresponding visual indicia described above in connection with FIGS. 4-17 tradeoff in terms of the attributes of the process variables and/or the aspects of the corresponding trend information that are emphasized to an operator. Accordingly, the particular icons used in any particular process control system setting can vary based on the needs and/or circumstances of the particular operations being monitored and controlled and/or the preferences of the operators associated with the particular process control system. In some examples, to further assist operators in quickly identifying circumstances and/or process attributes of particular interest and/or concern, the icons rendered in a relatively sparse layout and arranged (e.g., horizontally aligned, vertically aligned, etc.) in a manner that draws the attention of the operators to the salient issues. For example, an icon indicating a single decreasing parameter among a number of other icons indicating parameters that are non-decreasing may pop-out or attract the attention of an operator for easy spotting. Some such example arrangements of the icons are described in greater detail below.

Figure 18:
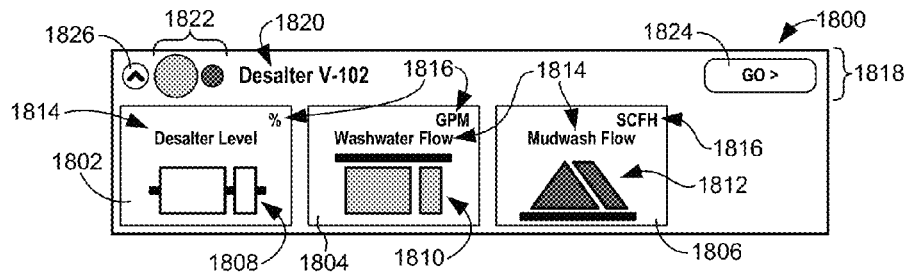
FIG. 18 illustrates an example process variable summary pane for display by the example operator station of FIG. 2 containing example basic graphics corresponding to three process variables associated with a component of the example process control system of FIG. 1.
Figure 19:
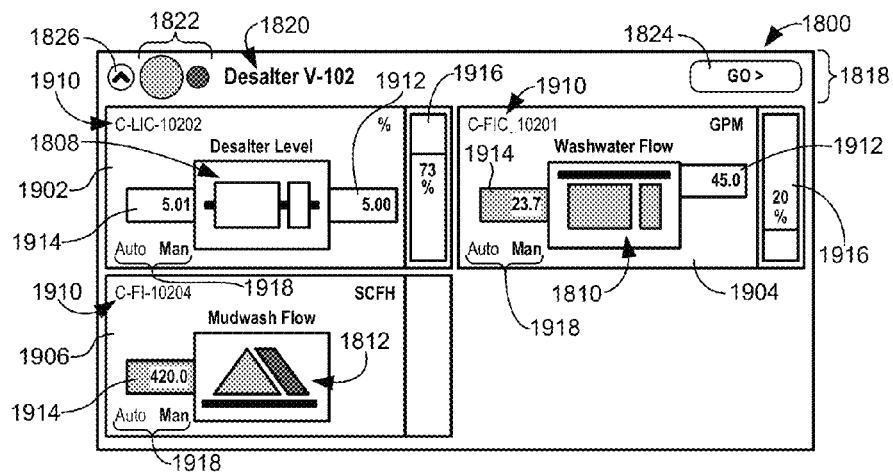
FIG. 19 illustrates the example process variable summary pane of FIG. 18 containing example mid-level graphics to indicate more information than the example graphics of FIG. 18.
Figure 20:
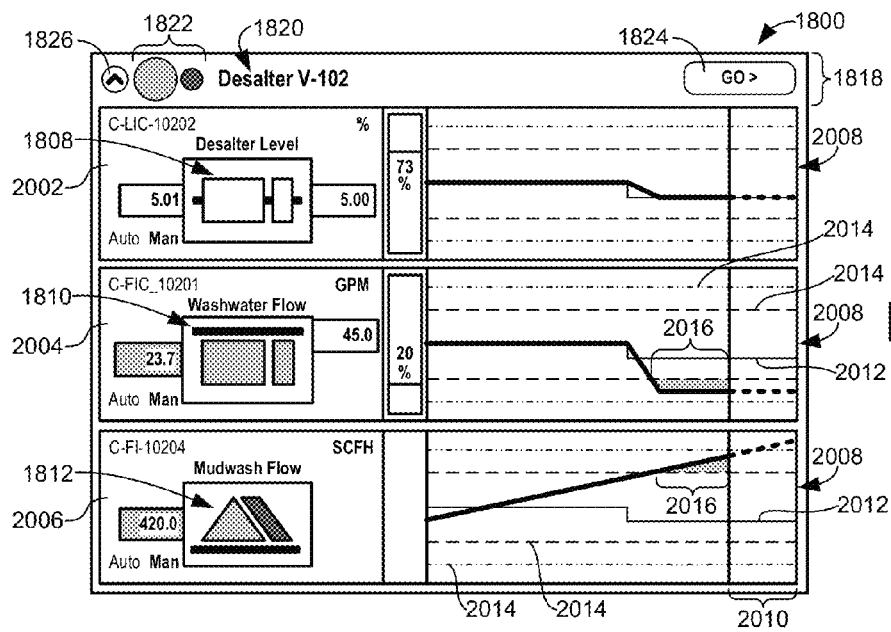
FIG. 20 illustrates the example process variable summary pane of FIG. 18 containing example detailed graphics to indicate more information than the example graphics of FIG. 19.
Figure 21:
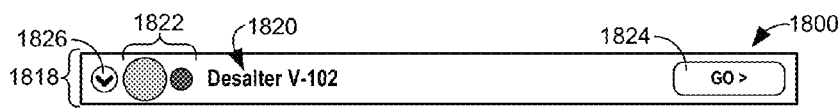
FIG. 21 illustrates the example process variable summary pane of FIGS. 18-20 in a collapsed form.

FIGS. 18-21 illustrate an example process variable summary pane 1800 that includes example graphics associated with three process variables of a desalter module of a process control system (e.g., the example process control system 100 of FIG. 1). The graphics may correspond to the graphics 312 described above in connection with FIG. 3. The graphics in each of the FIGS. 18-20 include varying levels of detail to provide varying amounts of information relating to the process variables based on the needs and/or desires of an operator. More particularly, FIG. 18 illustrates the example process variable summary pane 1800 containing example basic graphics 1802, 1804, 1806. FIG. 19 illustrates the example process variable summary pane 1800 containing example mid-level graphics 1902, 1904, 1906. FIG. 20 illustrates the example process variable summary pane 1800 containing example detailed graphics 2002, 2004, 2006. FIG. 21 illustrates the summary pane 1800 in a collapsed form with the graphics hidden from view.

As shown in the illustrated examples, each of the basic graphics 1802, 1804, 1806, mid-level graphics 1902, 1904, 1906, and detailed graphics 2002, 2004, 2006 include the same icons 1808, 1810, 1812, respectively, which are similar to the icons described above in connection with FIG. 8. Additionally, the basic graphics 1802, 1804, 1806 in the illustrated example of FIG. 18 include summary information such as a name 1814 of the process variable or parameter being measured and a corresponding units of measurement 1816. In some examples, the basic graphics 1802, 1804, 1806 may be limited to the icons without any additional information.

The example mid-level graphics 1902, 1904, 1906 of FIG. 19 include the same summary information provided in the basic graphics 1808, 1810, 1812 but also add additional details. For example, the mid-level graphics 1902, 1904, 1906 of the illustrated example include a parameter code or tag 1910 associated with the process variable, a set point or target value indicator 1912 for the corresponding process variable, a measured value indicator 1914 of the corresponding process variable, an output indicator 1916 associated with the corresponding process variable if appropriate (e.g., output of a control valve), and a mode indicator 1918 to indicate whether the process is under automatic or manual control. As shown in the example illustration, the measured value indicator 1914 is positioned at the same level as the trend indicator of the corresponding icon 1808, 1810, 1812 while the set point value indicator 1912 is positioned at a level corresponding to each respective set point indicator to provide a second visual indication of whether the value of the process variable is above, below, or approximately the same as the set point. Furthermore, the measured value indicator 1914 is filled with the same shading as the current state section of the corresponding icon 1808, 1810, 1812 to indicate the current state of the process variable.

The example detailed graphics 2002, 2004, 2006 of FIG. 20 include the same information provided in the mid-level graphics 1902, 1904, 1906 of FIG. 19 but also add additional details. For example, the detailed graphics 2002, 2004, 2006 may include a trend graph 2008 that plots the value of the process variable over a certain time period. In some examples, the trend graph 2008 includes a projected trend region 2010 to visually represent an expected path of the process variable if it continues on its current trend. As shown in the example trend graphs 2008 of FIG. 20, a set point line 2012 and one or more alarm lines 2014 are included to visually indicate the relative position of the process variable with respect to the set point and alarm limits over the time period displayed in the graph 2008. Additionally, in some examples, the trend graphs 2008 may identify alarm state portions 2016 (e.g., via different shading, patterns, colors, or other visually distinguishable indicia) that enable the timing, duration, and state of alarms associated with the process variable to be tracked or tagged over time.

A top banner 1818, of the example process variable summary pane 1800 of FIGS. 18-21 provides a title and/or code 1820 associated with the plant, area, unit, module or other component of a process control system corresponding to the summary pane 1800. The top banner 1818 may also include a summary icon 1822 that provides summary data associated the process variables associated with the component of the process control system corresponding to the process variable summary pane 1800. For instance, in the illustrated example, the summary icon 1822 indicates the worst current state (e.g., by the shading or other graphical indicia of the large circle) and/or the worst projected state (e.g., by the shading or other graphical indicia of the small circle) among all process variables associated with the corresponding component of the process control system. In some examples, the top banner 1818 includes a navigation button 1824 that enables an operator to navigate to a dedicated screen (e.g., a process diagram 304 displayed via the P&ID display area 302) associated with the particular component of the process control system. In the illustrated example, the top banner 1818 of the summary pane 1800 also includes a collapse/expand button 1826 to collapse the process variable summary pane 1800 to just the top banner 1818 as shown in FIG. 21, or to expand the process variable summary pane 1800 of FIG. 21 to anyone of the expanded views shown in FIGS. 18-19.

Figure 22:
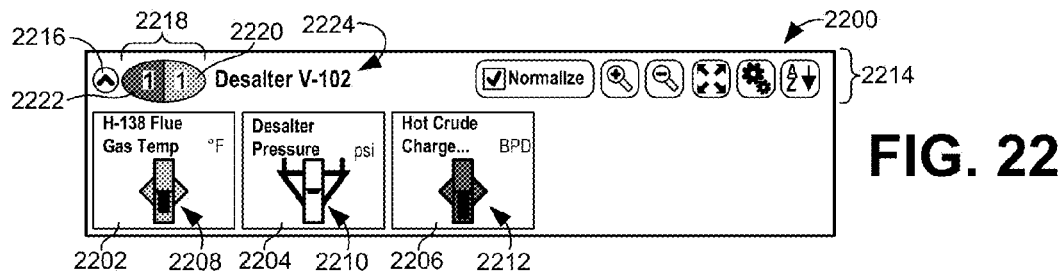
FIGS. 22-25 illustrate another example process variable summary pane containing other example basic, mid-level, and detailed graphics similar to the example process variable summary pane of FIGS. 18-21.
Figure 23:
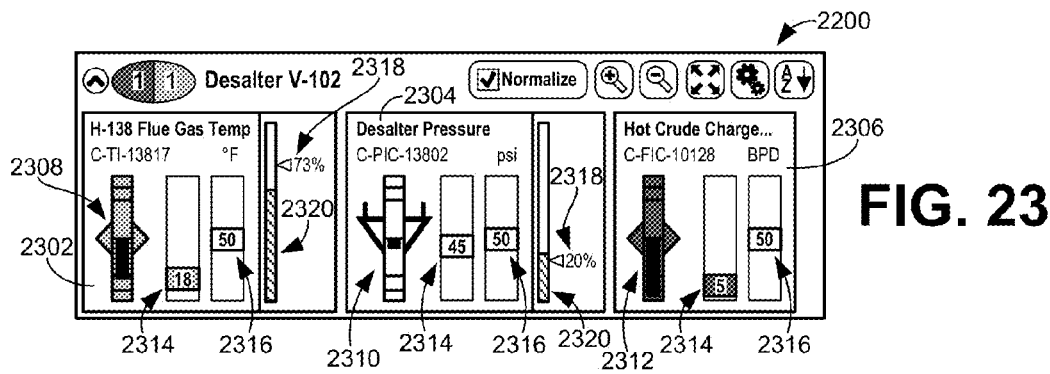
Figure 24:
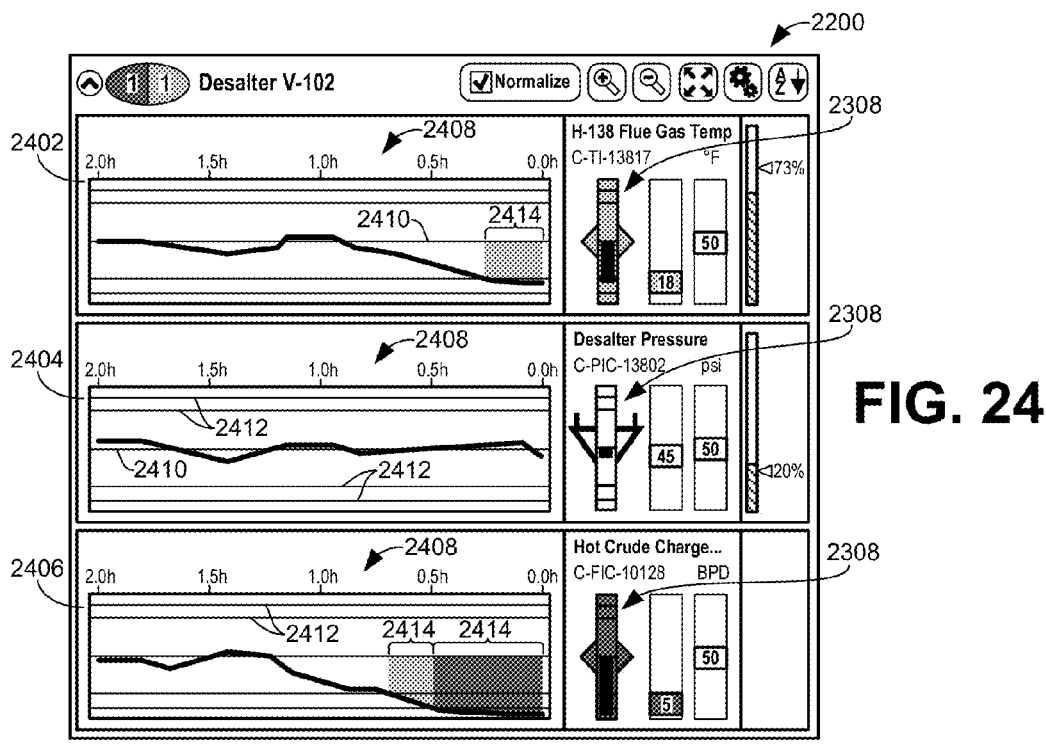
Figure 25:
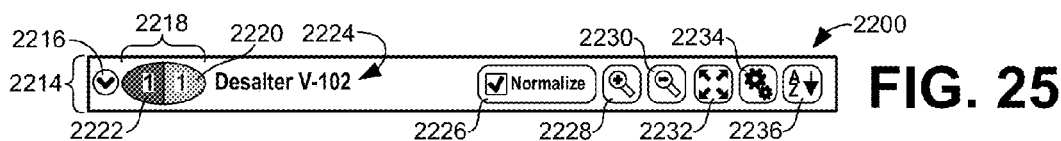

FIGS. 22-25 illustrate another example process variable summary pane 2200 that includes example graphics associated with three process variables of a desalter module of a process control system (e.g., the example process control system 100 of FIG. 1) similar to FIGS. 18-21. FIG. 22 includes example basic graphics 2202, 2204, 2206 comprising icons 2208, 2210, 2212 along with similar information described above in connection with FIG. 18. FIG. 23 includes example mid-level graphics 2302, 2304, 2306 comprising the information shown in the graphics 2202, 2204, 2206 of FIG. 22 plus some additional information similar to that described above in connection with FIG. 19. In particular, the graphics 2202, 2204, 2206 include icons 2308, 2310, 2312 that correspond to the icons 2208, 2210, 2212 of FIG. 22 except that they have an expanded range indicator bar that includes alarm limit lines similar to the icons described above in connection with FIG. 15. FIG. 24 includes example detailed graphics 2402, 2404, 2406 comprising all the information shown in the graphics 2302, 2304, 2306 of FIG. 23 plus additional information similar to that described above in connection with FIG. 20. FIG. 25 illustrates the process variable summary pane 2200 in a collapsed state with the graphics hidden from view similar to FIG. 21.

One difference between the example process variable summary pane 1800 of FIG. 18 and the example process variable summary pane 2200 of FIG. 22 is the type of icons used. As discussed above, the example icons 1808, 1810, 1812 are similar to the icons 802, 804, 806 described above in connection with FIG. 8 that visually represent the current state of the process variable (e.g., based on the shading of the current state section), the projected state of the process variable (e.g., based on the shading of the projected state section), the trend (e.g., direction) of the process variable (e.g., based on the trend identifying shape), and the relative position of the process variable with respect to the set point (e.g., based on the position of the set point indicator). In contrast, the example icons 2208, 2210, 2212 of FIG. 22 are similar to the icons 1602, 1604, 1606 described above in connection with FIG. 16 that visually represent the current state of the process variable (e.g., based on the shading of the icon), the direction of change (e.g., trend) of the process variable (e.g., based on the trend identifying shape), the qualitative characteristics or status of the trend (e.g., worsening or improving) (e.g., based on the thickness of the border of the trend identifying shape), the rate of change in the trend (e.g., based on the number of rate indicators (e.g., lines or tails) attached to the trend identifying shape), the relative position of the process variable with respect to the set point (e.g., based on whether the process variable indicator (e.g., the black band) is above or below the set point indicator), the relative deviation of the value of the process variable with respect to an operational range of values (e.g., based on the length of the process variable indicator relative to the range indicator bar).

In FIG. 23, the example graphics 2302, 2304, 2306 include a corresponding measured value indicator 2314 and a set point indicator 2316 that display the digital value of the corresponding measured value and the target value (e.g., set point) of the process variable. As shown in the illustrated example, the target value indicator 2316 is positioned to correspond to the set point indicator of the corresponding icon 2308, 2310, 2312 while the measured value indicator 2314 is positioned to correspond to the location of the process variable within the operational range of values as indicated in the corresponding example icon 2308, 2310, 2312 via the process variable indicator band. In this manner, the graphics 2302, 2304, 2306 provide a second visual representation of the relative position and deviation of the process variable with respect to the set point and operational range that includes the actual values of both the set point and the measured value of the process variable. Additionally, as shown in the illustrated examples, the shading of the measured value indicators 2314 correspond to the shading of the corresponding icons 2308, 2310, 2312 to indicate the operational state of the process variable. Furthermore, in some examples, the measured value indicator 2314 and/or the target value indicator 2316 may be selected (e.g., via a mouse click, or mouse hover) to display the full precision digital value (e.g., including all significant digits). In the illustrated example of FIG. 23, the example graphics 2302, 2304 include an output indicator 2318 to indicate the output of a field device (e.g., a control valve) associated with the corresponding process variable as well as an output device operational state indicator 2320 to indicate the state of the corresponding field device (e.g., the actual position of a control valve).

The example detailed graphics 2402, 2404, 2406 of FIG. 24 include the same information provided in the mid-level graphics 2302, 2304, 2306 of FIG. 23 but also add additional details. For example, the detailed graphics 2402, 2404, 2406 may include a trend graph 2408 similar to the trend graphs 2008 of FIG. 20. In some examples, each trend graph 2408 includes a set point line 2410 and one or more alarm limit lines 2412 that may be normalized to substantially align with the corresponding alarm limit indicator lines and set point indicator line of the corresponding icon 2308, 2310, 2312. In other examples, the trend graphs 2402, 2404, 2406 may be normalized based only on the set point. Furthermore, as shown in the example illustration, each trend graph 2408 is vertically aligned with the other trend graphs to enable comparison of the values of different process variables over the same time period, to compare different parameters to identify temporal coincidences and/or relationships in process variable changes, and/or to support diagnosis of the system. Additionally, in some examples, alarm tagging over time (e.g., tracking the timing, duration, and state of alarms associated with a process variable) may be graphically represented in the trend graphs 2408 via alarm state portions 2414 identified by different shading or other indicia (e.g., patterns, colors, etc.).

A top banner 2214, of the example process variable summary pane 2200 of FIGS. 22-25 may provide similar information and/or functionality as the top banner 1818 of FIGS. 18-21. For example, the top banner 2214 may include a collapse/expand button 2216 to collapse the process variable summary pane 2200 to just the top banner 2214 as shown in FIG. 25, or to expand the process variable summary pane 2200 of FIG. 25 to anyone of the expanded views shown in FIGS. 22-24. In some examples, the top banner 2214 may also include an alarm summary icon 2218 that provides alarm summary data associated the process variables within the process variable summary pane 2200. For instance, in the illustrated example, the alarm summary icon 2218 includes a low criticality alarm section 2220 and a high criticality alarm section 2222. Within the low and high criticality alarm sections 2220, 2222 a number may be displayed corresponding to the number of process variables associated with a corresponding low criticality alarm states (e.g., a low alarm state or a high alarm state) or high criticality alarm states (e.g., a low-low alarm state or a high-high alarm state) of the particular component of the process control system identified by a title 2224 in the top banner 2200. Furthermore, in some examples, the low and high criticality alarm sections 2220, 2222 contain the same visual characteristics (e.g., shading, color, pattern, outline, intensity, flashing, etc.) as the example icons associated with corresponding low or high criticality alarm states.

Additionally, as shown in the illustrated examples, the top banner 2214 may also include a normalize button 2226 to normalize the trend graphs 2402, 2404, 2406 as described above in connection with FIG. 24. The top banner 2214 of the illustrated example also includes zoom buttons 2228, 2230 to enable a user to change the degree of information provided in the process variable summary pane 2200. For example, pressing the zoom button 2228 when viewing the example process variable summary pane 2200 with the basic graphics 2202, 2204, 2206 as shown in FIG. 22 will convert (e.g., "zoom in") the summary pane 2200 to display the mid-level graphics 2302, 2304, 2306 as shown in FIG. 23. Pressing the zoom button 2228 again will display the summary pane 2200 with the detailed graphics 2402, 2404, 2406 as shown in FIG. 24. Pressing the zoom button 2230 will reverse the process described above. In this manner, an operator may control the amount of detail that is displayed and/or the amount of space that is consumed by the process variable summary pane 2200.

In some examples, a new window button 2232 is provided in the top banner 2214 to enable an operator to open the example process variable summary pane 2200 in a separate window. A module options button 2234 is provided in the top banner 2214 to enable an operator to add, delete, and/or edit a control module of the process control system. A sort button 2236 may also be provided in the top banner 2214 to enable an operator to sort and/or filter the graphics displayed within the process variable summary pane 2200 (e.g., sort by alphabetical order, engineered order, order of severity, etc.).

Figure 26:
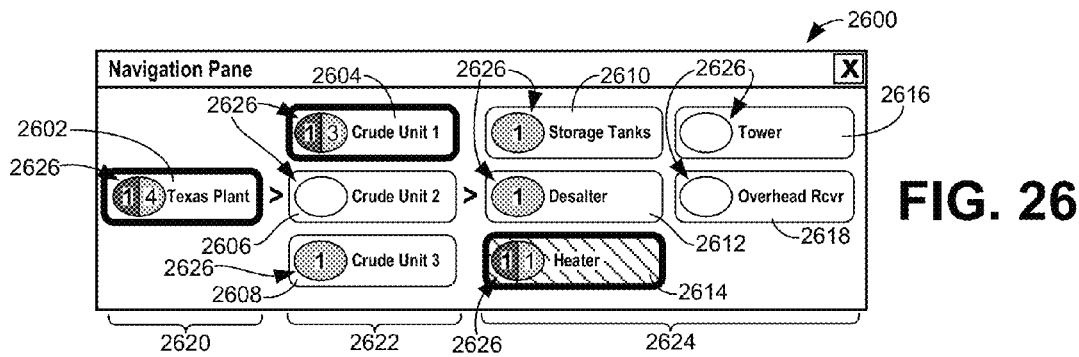
FIG. 26 illustrates an example navigation pane for display by the example operator station of FIG. 2 containing example navigation buttons associated with components of the example process control system of FIG. 1.

FIG. 26 illustrates an example navigation pane 2600 associated with at least a portion of a process control system (e.g., the example process control system 100 of FIG. 1). The example navigation pane 2600 includes multiple navigation buttons 2602, 2604, 2606, 2608, 2610, 2612, 2614, 2616, 2618 grouped or arranged in separate columns 2620, 2622, 2624. Each navigation button 2602, 2604, 2606, 2608, 2610, 2612, 2614, 2616, 2618 corresponds to a particular component (e.g., a plant, an area, a unit, an equipment module, a control module, etc.) in the process control system. Each column 2620, 2622, 2624 corresponds to a different level in a hierarchy of components of the process control system and, therefore, contains the navigation buttons 2602, 2604, 2606, 2608, 2610, 2612, 2614, 2616, 2618 associated with components corresponding to the hierarchy level of each column 2620, 2622, 2624. In the illustrated example, higher or upper levels of components (e.g., parent components) are towards the left and lower levels (e.g., child components or subcomponents) are towards the right. For instance, in the illustrated example of FIG. 26, the left-hand column 2620 corresponds to the plant level of a hierarchy of the process control system and includes a single navigation button 2602 labeled as "Texas Plant" that corresponds to a single plant in the process control system. The next level down in the hierarchy (corresponding to the middle column 2622) of the illustrated example is the unit level, which contains the navigation buttons 2604, 2606, 2608 respectively labeled as "Crude Unit 1," "Crude Unit 2," and "Crude Unit 3" that correspond to three process units within the plant of the process control system. The next level down in the example hierarchy (and bottom level represented in the example navigation pane 2600 in column 2624) is the equipment module level, which contains the navigation buttons 2610, 2612, 2614, 2616, 2618 respectively labeled as "Storage Tanks," "Desalter," "Heater," "Tower," and "Overhead Receiver" that correspond to five process modules of the process control system. In some examples, the navigation pane 2600 may contain more columns to represent other levels within the process control system hierarchy (e.g., equipment module levels and/or control module levels).

In the illustrated example, each column 2620, 2622, 2624 in the illustrated example corresponds to a single branch of child components associated with a common parent component in the hierarchy. That is, the navigation buttons associated with lower levels in the hierarchy that are shown in the example navigation pane 2600 correspond to components that are a subset of components contained within one of the components represented by one of the navigation buttons in the level immediately above the corresponding lower level. For example, the navigation buttons 2610, 2612, 2614, 2616, 2618 in the right-hand level column 2624 may correspond to process modules that are all associated with the same process unit within the process control system (e.g., the first crude process unit associated with the navigation button 2604 in the middle column 2622). Similarly, each of the three navigation buttons 2604, 2606, 2608 in the middle column 2622 may correspond to process units that are all associated with the same plant (e.g., the plant associated with the navigation button 2602 in the left-hand column 2620). Thus, while the crude process units associated with the navigation buttons 2606, 2608 may have multiple sub-components (e.g., multiple equipment and/or control modules), these are not represented by navigation buttons in the navigation pane 2600 shown in FIG. 26 because they are within branches of the hierarchy other than the one shown. In the illustrated example, the particular branch of each level of the hierarchy that is displayed in the navigation pane 2600 at any given time may be based on a current view (e.g., a current process diagram 304 in the P&ID display area 302) of the process control system. For example, if the heater module associated with the navigation button 2614) of the first crude process unit associated with the navigation button 2604) is currently being viewed, all the navigation buttons in the branches from the top level (e.g., the plant associated with the navigation button 2602) down to the level associated with the heater module are displayed. As shown in the illustrated example, the sibling components (e.g., components that directly branch from the same parent component one level up the hierarchy) at each level of the hierarchy are also displayed. In some examples, the navigation button corresponding to the specific component currently being viewed (e.g., via the P&ID display area 302) is graphically distinguished from the other navigation buttons. For example, as shown in FIG. 26, when an operator is viewing a P&ID for the heater module of the first unit of the plant, the navigation button 2614 corresponding to the heater module has a unique visual characteristic (e.g., different pattern) to distinguish it from the remaining navigation buttons. Although the illustrated example shows the navigation button 2614 having a unique pattern, any other visually distinctive characteristic may alternatively be used (e.g., shading, color, shape, size, outline, orientation, symbol, notation, bordering, flashing, highlighting, etc.). Additionally or alternatively, each navigation button in a direct path or line from a top level of the hierarchy (e.g., a plant) down to the particular component (e.g., area, unit, module, etc.) being viewed is graphically altered to be distinguishable from the other navigation buttons. For example, the navigation buttons 2602, 2604, 2614 include a thick border; however, any other visually identifiable characteristic may alternatively be used. In this manner, operators may quickly determine what they are viewing and how it relates to other components within the process control system and the other navigation buttons within the navigation pane 2600.

As shown in the illustrated example, each of the navigation buttons 2602, 2604, 2606, 2608, 2610, 2612, 2614, 2616, 2618 includes an alarm summary icon 2626 similar to the alarm summary icon 2218 described above in connection with FIGS. 22-25 except that the alarm summary data indicated by each alarm summary icon 2626 corresponds to process variables associated with the corresponding navigation button 2602, 2604, 2606, 2608, 2610, 2612, 2614, 2616, 2618. For instance, in the illustrated example, the summary icons 2626 indicate the number of process variables associated with the component corresponding to each navigation button and which are currently in an alarm state (e.g., alarm states with a high criticality and/or a low criticality). The process variables associated with a particular component may include the process variables that are directly associated with the component and/or associated with any lower level component contained within the component (e.g., a child component of the particular component at issue). For example, the alarm summary icons 2626 of the navigation buttons 2610, 2612 indicate that each of the corresponding components (e.g., storage tanks module and desalter module) are associated with one process variable in a low criticality alarm state (e.g., based on the light-shading) and the alarm summary icon 2626 of the navigation button 2614 corresponding to the heater module indicates one process variable is in a low criticality alarm state and one process variable is in a high criticality alarm state. In the illustrated example, all three process modules (e.g., storage tanks, desalter, heater) are sub-components with the first crude process unit represented by the navigation button 2604. Accordingly, the alarm summary icon 2626 of the navigation button 2604 indicates one process variable in a high criticality alarm state (e.g., from the heater module) and three process variables in a low criticality alarm state (e.g., one from each of the storage tanks module, the desalter module, and the heater module). The navigation button 2602 associated with the entire plant indicates one additional low criticality alarm state corresponding to a process variable associated with the third crude process unit as indicated by the alarm summary icon 2626 of the navigation button 2608. Based on this convention, operators can quickly determine what component of the process control system they are viewing via the P&ID display area 302 and its relationship to other components in the process control system. Thus, operators can also quickly assess and/or identify the state of the components and where their attention may be needed to resolve outstanding alarm issues.

Figure 27:
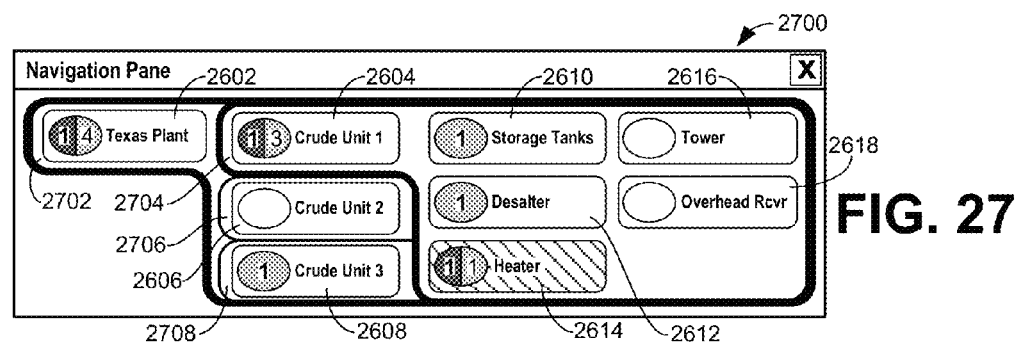
FIG. 27 illustrates another example navigation pane containing the example navigation buttons of FIG. 26.

FIG. 27 illustrates another example navigation pane 2700 associated with the same portion of the example process control system represented in the example navigation pane 2600 of FIG. 26. The example navigation pane 2700 is similar to the example navigation pane 2600 except that each branch in the hierarchy is placed within a separate tab 2702, 2704, 2706, 2708. Accordingly, in the illustrated example, rather than marking the navigation buttons in the direct path of the hierarchy (e.g., via a thick border as described above in connection with FIG. 26), the tabs 2702, 2704, 2706, 2708 associated with each component in the direct line of the hierarchy are brought to a front view and highlighted with a bold outline and/or otherwise graphically identified. As with FIG. 26, the navigation button in FIG. 27 associated with the current view (e.g., the process diagram 304) of the P&ID display area 302 (e.g., the navigation button 2614 associated with the heater module) is visually distinguished (e.g., via shading, color, pattern, highlighting, outlining, flashing, etc.). In this manner, an operator can visually identify the context of the current view displayed in the P&ID display area 302 relative to the rest of the process control system. Additionally, the outline of the tabs 2702, 2708 serve to graphically represent that each of the three crude process units (represented by the navigation buttons 2604, 2606, 2608) are subcomponents within the plant (represented by the navigation button 2602) and that each of the five process modules (represented by the navigation buttons 2610, 2612, 2614, 2616, 2618) are subcomponents within the first crude process unit (represented by the navigation button 2604).

Figure 28:
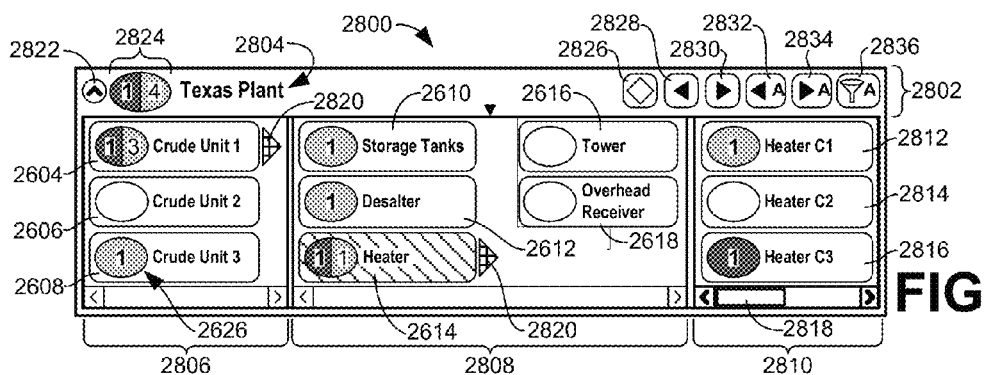
FIG. 28 illustrates another example navigation pane containing the example navigation buttons of FIGS. 26 and/or 27.

FIG. 28 illustrates another example navigation pane 2800 associated with the same portion of the example process control system of FIGS. 26 and/or 27. However, unlike the example navigation pane 2600 of FIG. 26 and the example navigation pane 2700 of FIG. 27, the example navigation pane 2800 includes a top banner 2802 with a title 2804 identifying the top level of the process control system represented in the navigation pane (e.g., the Texas plant). As such, in the illustrated example of FIG. 28, a left-hand column 2806 corresponds to the unit level of the hierarchy and contains the navigation buttons 2604, 2606, 2608 and a middle column 2808 corresponds to the area level of the hierarchy and contains the navigation buttons 2610, 2612, 2614, 2616, 2618. A right-hand column 2810 of the example navigation pane 2800 includes navigation buttons 2812, 2814, 2816 corresponding to components in the next level down the hierarchy (e.g., equipment and/or control modules). In some examples, each column 2806, 2808, 2810 may have an adjustable width to account for more or less components associated with the corresponding level of the hierarchy. Additionally or alternatively, the columns 2806, 2808, 2810 may contain more navigation buttons than are shown at any one time but may be viewed by using a corresponding scroll bar 2818. The example navigation pane 2800 is similar or identical to the example navigation pane 308 of FIG. 3 except that the navigation pane 2800 shows additional detail and corresponds to the heater module displayed via the P&ID display area 302 rather than the first crude process unit being displayed via the P&ID display area 302 as shown in FIG. 3.

In the illustrated example, the lower level components contained within a particular higher level component represented in the example navigation pane 2800 are identified by a marker 2820 (e.g., a triangle or arrow) located next to each higher level navigation button corresponding to the direct line of components in the hierarchy pointing down to the navigation button associated with the currently viewed component. For example, the marker 2820 next to the navigation button 2604 indicates that all the navigation buttons displayed in the lower levels (e.g., the navigation buttons 2610, 2612, 2614, 2616, 2618 in the column 2808 and the navigation buttons 2812, 2814, 2816 in the column 2810) correspond to subcomponents within the first crude process unit of the process control system (i.e., the upper component associated with the navigation button 2604). Similarly, the marker 2820 next to the navigation button 2614 indicates that the navigation buttons 2812, 2814, 2816 correspond to components within the heater module (i.e., the upper component associated with the navigation button 2614). Additionally or alternatively, the direct path of components from the top level of the hierarchy down to the currently viewed component may also be indicated by altering the appearance of the corresponding navigation button(s) along the direct path (e.g., by changing the shading, color, pattern, brightness, outline, etc. of the corresponding navigation button(s) similar to what was described above in connection with FIG. 26). Furthermore, as with FIGS. 26 and 27, the navigation button in FIG. 28 associated with the current view (e.g., the process diagram 304) of the P&ID display area 302 (e.g., the navigation button 2614 associated with the heater module) is visually distinguished (e.g., via a unique shading, pattern, color, shape, size, outline, orientation, symbol, notation, flashing, highlighting, etc.).

Figure 29:
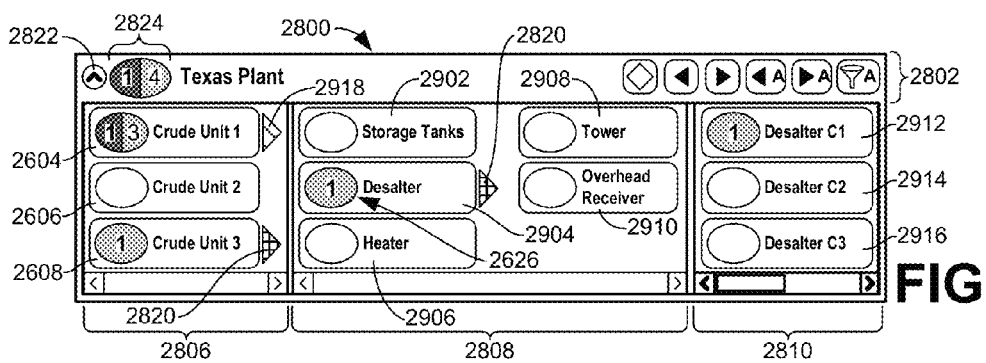
FIG. 29 illustrates another view of the example navigation pane of FIG. 28.

As will be described in greater detail below, selecting (e.g., via a mouse click) any one of the navigation buttons may change the current view (e.g., the displayed process diagram 304 in the P&ID display area 302) of the process control system to correspond to the component selected. In this manner, in addition to providing contextual awareness to operators regarding the current view relative to other components as well as the alarm state of the components, the example navigation pane 2800 enables an operator to quickly navigate to any component in the process control system and bring up the corresponding P&ID and/or other information for further analysis. In other examples, selecting (e.g., via a mouse click) one of the navigation buttons may not immediately change the process diagram 304 to the selected component but merely give a preview of the selected component within the navigation pane. For example, an operator may be viewing the example navigation pane 2800 as shown in FIG. 28 and want to know the source of the single alarm indicated in the alarm summary icon 2626 of the navigation button 2608 corresponding to the third crude process unit of the process control system. To do so, an operator may select the navigation button 2608 in the left-hand column 2806 to then update the remaining columns 2808, 2810 to show navigation buttons associated with the subcomponents of the third crude process unit as indicated in FIG. 29. That is, upon selecting the navigation button 2608 in the example navigation pane 2800 of FIG. 28, the marker 2820 is displayed next to the navigation button 2608 to indicate that the middle column 2808 has been repopulated with new navigation buttons 2902, 2904, 2906, 2908, 2910 corresponding to the components within the third crude process unit of the process control system. Then, upon selecting the navigation button 2904 (indicated as the source or location of the alarm based on the alarm summary icon 2626), the right-hand column will be populated with navigation buttons 2912, 2914, 2916 and another marker 2820 will be displayed next to the navigation button 2904 to indicate that the navigation buttons 2912, 2914, 2916 in the third column 2810 correspond to subcomponents within the desalter module represented by the navigation button 2904.

Although the content of the columns 2806, 2808, 2810 between the example navigation pane 2800 shown in FIGS. 28 and 29 is different, in some examples, the navigation pane 2800 of FIG. 29 is a preview of the desalter module of the third crude process unit such that the P&ID of the heater module of the first crude process unit will remain on display in the P&ID display area 302. In some examples, navigating to a preview display in the navigation pane 2800 may be accomplished by selecting the corresponding navigation buttons in a first manner (e.g., a single mouse click) and actually navigating to a new P&ID display area 302 (e.g., with a different process diagram 304) may be accomplished by selecting the corresponding navigation button in a second, different manner (e.g., a double mouse click).

As described above, the markers 2820 next to the navigation buttons 2608, 2904 of FIG. 29 and/or the distinctive appearance (e.g., based on shading, color, pattern, border, notation, etc.) of the navigation buttons 2608, 2904 of FIG. 29 indicate the relationship of the navigation buttons in each column 2806, 2808, 2810 (e.g., the branches and/or paths of the hierarchy) that are currently being displayed. However, when a preview navigation pane is shown (e.g., the navigation pane 2800 of FIG. 29), the navigation button corresponding to the particular component actually being displayed in the P&ID display area 302 may be hidden (e.g., the navigation button 2614 of FIG. 28). Accordingly, as shown in the example navigation pane 2800 of FIG. 29, a separate marker 2918 may be shown next to the navigation button corresponding to the branch of the hierarchy of the process control system associated with the currently viewed component in the P&ID display area 302. Additionally, the marker 2918 may be different in appearance (e.g., based on color, pattern, outline, shape, notation, etc.) than the markers 2820 described above to distinguish the purposes of the markers 2820, 2918. In some examples, the unique visual characteristic of the marker 2918 may correspond to the visually distinguishing feature (e.g., color, pattern, shading, highlight, border, etc.) of the navigation button associated with the component corresponding to the P&ID display area 302 (e.g., the navigation button 2614 of FIG. 28).

The top banner 2802 of the example navigation pane 2800 of FIGS. 28 and 29 includes a collapse/expand button 2822 and a summary icon 2824 that are similar to the collapse/expand button 2216 and the summary icon button 2218 described above in connection with FIGS. 22-25. Additionally, in some examples, the top banner 2802 includes a P&ID display button 2826 that returns the example navigation pane 2800 to show the navigation buttons associated with the component in the process control system currently being displayed via the P&ID display area 302. For instance, if an operator were to select (e.g., mouse click) the P&ID display button 2826 after navigating to the preview navigation pane 2800 shown in FIG. 29, the navigation pane 2800 would return to the view shown in navigation pane 2800 of FIG. 28 corresponding to the heater module that is currently being displayed in the P&ID display area 302. In some examples, the top banner 2802 may also include a back button 2828 and a forward button 2830 to browse back and forth between different views that an operator has navigated through while using the navigation pane 2800. Additionally or alternatively, the top banner 2802 also includes a previous alarm button 2832 and a next alarm button 2834 to skip back and forth between pages (e.g., process diagrams 304 in the P&ID display area 302) that are associated with at least one process variable currently in an alarm state. Furthermore, the top banner 2802 may include an alarm filter button 2836 to reconfigure the navigation pane 2800 to only show navigation buttons associated with components that include at least one process variable under an alarm state and/or to filter the navigation pane 2800 to only show navigation buttons associated with high-criticality alarms. Additionally or alternatively, a separate sort button (similar to the sort button 2236 described in connection with FIG. 25) may be provided to sort and/or filter the navigation buttons in other manners (e.g., sort by alphabetical order, engineered order, order of severity, etc.).

Figure 30:
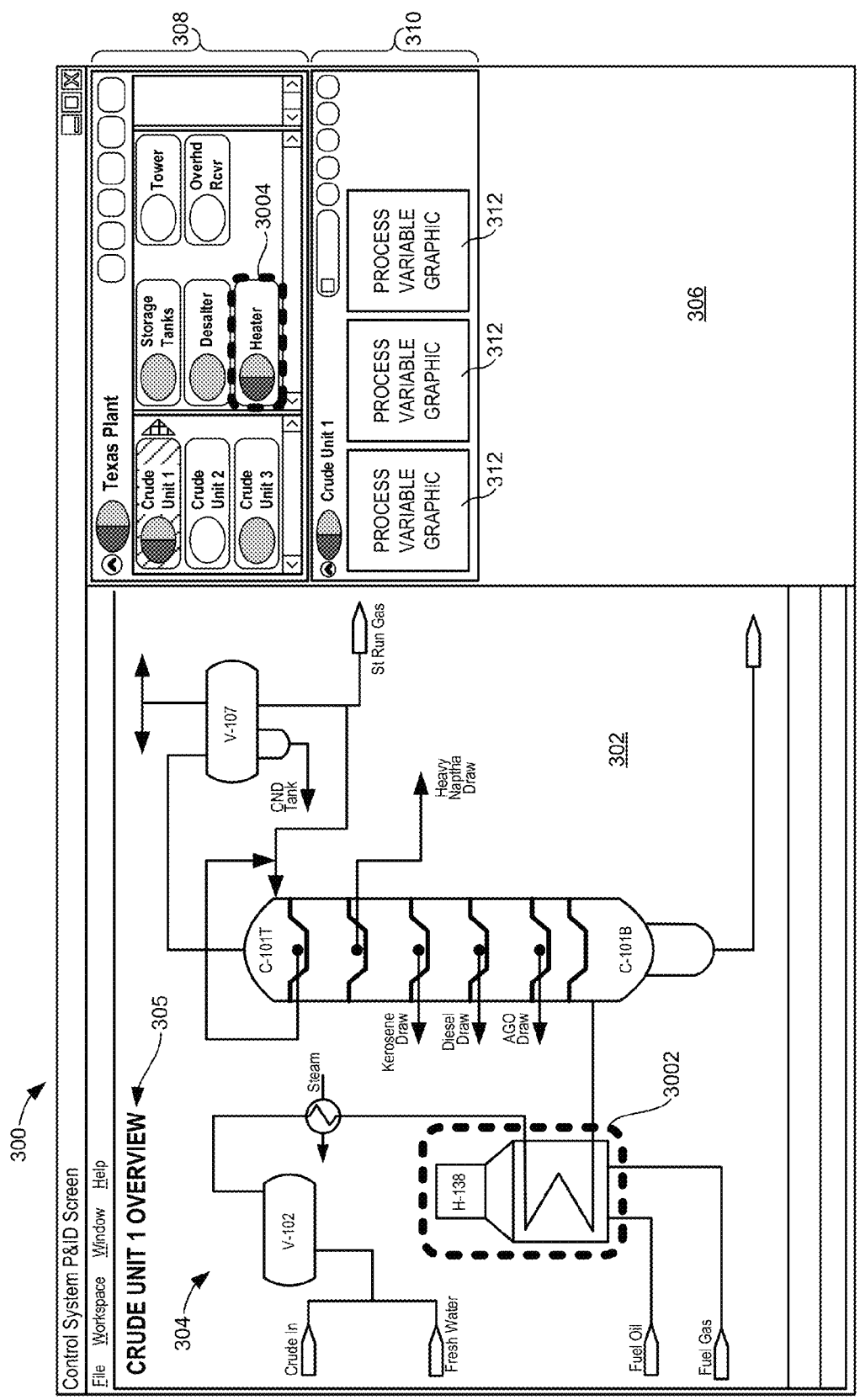
FIG. 30 illustrates the example operator interface of FIG. 3.

FIG. 30 illustrates the example operator interface 300 of FIG. 3 with the P&ID display area 302, the navigation pane 308, and the process variable summary pane 310. As explained above in connection with FIG. 3, the process diagram 304 displayed within the P&ID display area 302 may change to correspond to various components and/or subcomponents within the process control system that are selected by an operator for display. As such, in some examples, one or more of the elements within a particular process diagram 304 associated with an upper level component within the hierarchy of the process control system (e.g., the process unit as shown in FIG. 30) may be representative of lower level components within the hierarchy that are associated with a separate, more detailed process diagram 304. In some examples, when an operator selects (e.g., via a mouse click) and/or hovers over (e.g., with a mouse pointer) an element in the process diagram 304 representative of such a subcomponent the element may be highlighted, outlined, or otherwise distinguished as shown by the dashed line 3002 identifying the element representative of the heater module of the displayed process unit of the process control system. Further, the corresponding navigation button within the navigation pane 308 may also be identified at the same time (e.g., as shown by the dashed line 3004) to enable an operator to assess the relationship of different information displayed at different locations within the operator interface 300. Similarly, in the illustrated example, selecting (e.g., with a mouse click) and/or hovering over (e.g., with a mouse pointer) the navigation button will highlight, outline, or otherwise identify the navigation button and the corresponding element within the process diagram 304 of the P&ID display area 302. In some examples, if the element within the process diagram 304 or the navigation button are selected (e.g., via double mouse click), the P&ID display area 302 will be automatically updated with a new process diagram 304 corresponding to the selected component of the process control system. In such examples, the navigation pane 308 is appropriately updated.

Figure 31A:
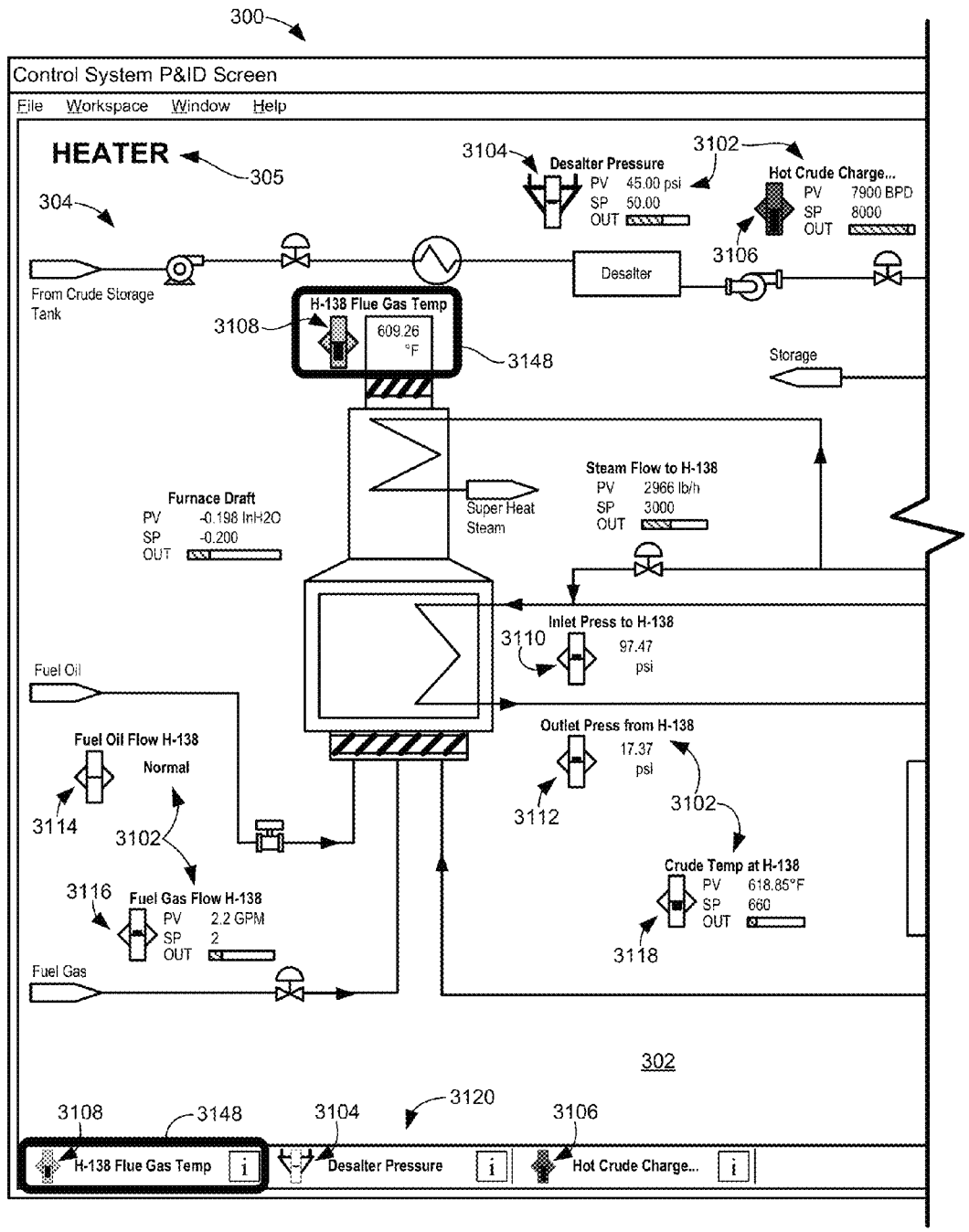
FIGS. 31A-31B illustrate a more detailed view of the example operator interface of FIGS. 3 and/or 30 after navigating to the heater module of the example process unit displayed in FIG. 30.
Figure 31B:
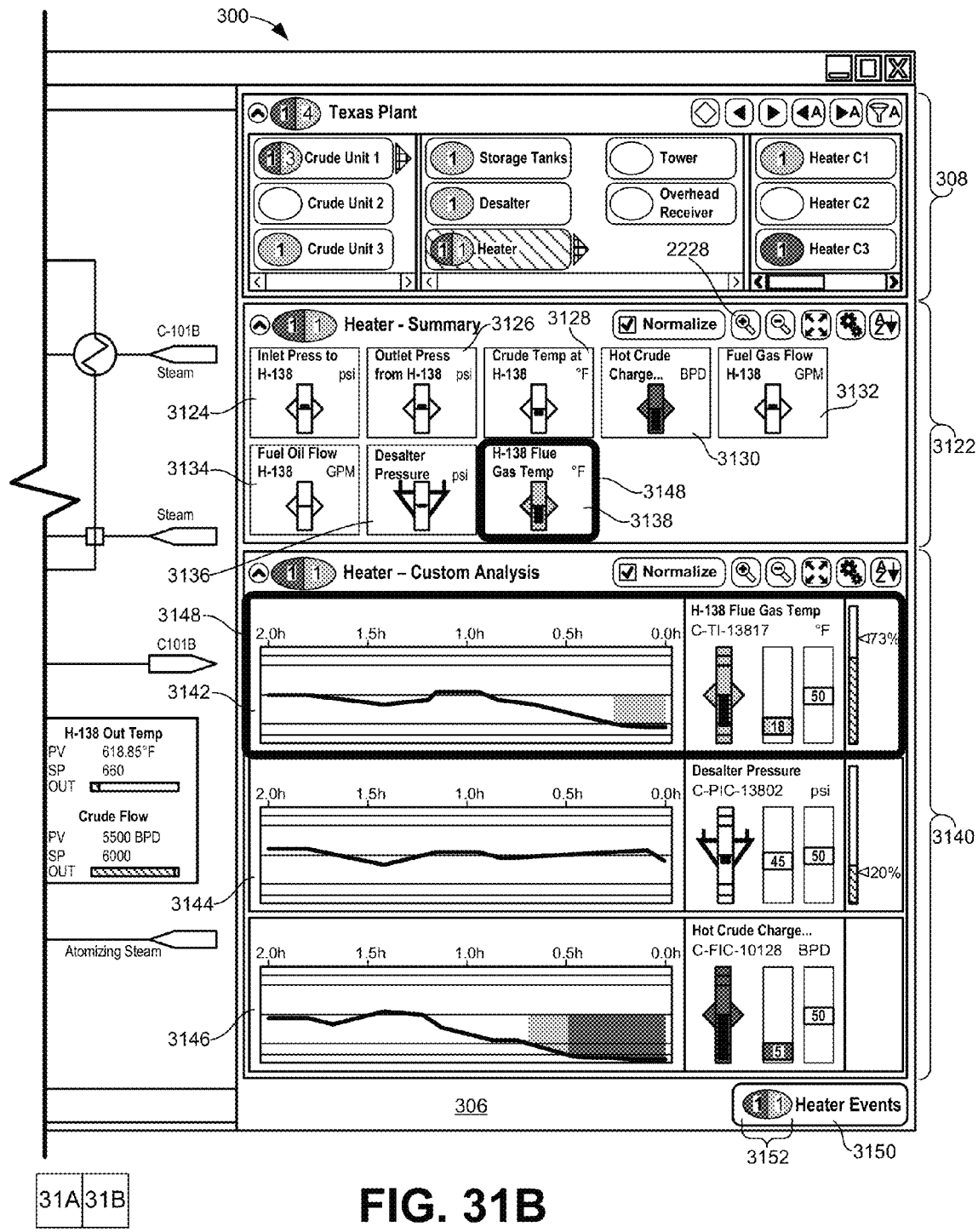

FIGS. 31A-31B illustrate a more detailed view of the example operator interface 300 of FIG. 30 after an operator has selected the heater module for display via the P&ID display area 302. In the illustrated example, the process diagram 304 has changed from a representation of the first crude process unit (e.g., Crude Unit 1) as shown in FIG. 30 to a representation the components and/or elements of the process control system associated with the heater module. In the illustrated example, the title 305 has changed to reflect the updated view. Additionally, the navigation buttons within the navigation pane 308 corresponding to the selected heater module have also changed to reflect the fact that the navigation pane 308 corresponds to the process diagram 304 currently displayed (which corresponds to the navigation pane 2800 described above in connection with FIG. 28). As with many known process control system operator interfaces, the process diagram 304 within the example operator interface 300 of FIGS. 31A and 31B includes basic process variable data 3102 providing real-time information for specific process variables associated with the displayed heater module (e.g., tag or name, process variable value, set point, output, etc.). Additionally, as shown in the illustrated example, adjacent at least some of the process variable data 3102 are corresponding icon 3104, 3106, 3108, 3110, 3112, 3114, 3116, 3118 that may be similar or identical to one or more of the icons described above in connection with FIGS. 4-17. In this manner, operators do not have to compare (e.g., determine a numerical difference between) the displayed values of the process variable and the corresponding set point to identify the condition of the process control system components (e.g., the trend direction, alarm state, alarm severity, rate of change, etc.). Furthermore, the icons 3104, 3106, 3108, 3110, 3112, 3114, 3116, 3118 enable operators to quickly identify the trend of the process variable to assess outstanding alarms and/or to anticipate imminent alarms, which is not possible based solely on the information provided via the process variable data 3102 because the data 3102 only provides the most current data available (e.g., at a single point in time) rather than changes in the process variable over time.

As a result of the information conveyed by the icons 3104, 3106, 3108, 3110, 3112, 3114, 3116, 3118 in the illustrated example, operators can quickly and intuitively recognize that two process variables (associated with the icons 3106, 3108) are in alarm states (e.g., based on the shading of the icons) while the remaining process variables are within a normal operating state. Further, the operators can quickly and intuitively recognize that the process variables in an alarm states have reached a steady state (e.g., based on the trend identifying shape) and that in both cases the measured value of the process variable is below the set point (e.g., based on the position of the process variable indicator (e.g., the black band) relative to the set point indicator line). Additionally, the operators can recognize that, although the remaining process variables are all within normal operating states, one of the process variables (associated with the icon 3104) is dropping e.g., (based on the pointed direction of the trend identifying shape) at a relatively fast rate (e.g., based on the rate indicators of the icon) in a direction away from the set point (i.e., the condition is worsening) (e.g., based on the thick border of the trend identifying shape). The icons 3110, 3112, 3114, 3116, 3118 corresponding to the remaining process variables enable an operator to recognize that the process variables are in a normal operating state and maintaining their current value (i.e., steady state). Furthermore, operators can quickly and intuitively determine whether the value for each such process variable is above, at, or below the set point (based on the relative position of the set point indicator line and the process variable indicator).

In the illustrated example of FIGS. 31A-31B, the operator interface 300 also includes an alarm banner 3120 that specifically identifies the process variables that are currently operating in an alarm state, projected to be operating in an alarm state, and/or are associated with a trend that is worsening. Furthermore, in some examples, the process variables identified in the alarm banner 3120 are provided with the corresponding icons 3104, 3106, 3108). In this manner, operators do not need to visually canvass the entire process diagram 304 to identify potential issues within the current view as they are grouped in an alarm banner along with the icons 3104, 3106, 3108 that provide the additional information to enable operators to quickly assess the condition of each identified process variable without having to click on the alarm banner 3120 to open a separate alarm display to determine the details.

Additionally, in some examples, the icons 3104, 3106, 3108, 3110, 3112, 3114, 3116, 3118 are displayed separately from the process diagram 304 within a process variable summary pane 3122. In this manner, all of the icons 3104, 3106, 3108, 3110, 3112, 3114, 3116, 3118 are grouped together regardless of whether the corresponding process variables are associated with an active alarm condition for quick comparison and/or review by operators. More particularly, the example process variable summary pane 3122 shown in FIG. 31B comprises basic graphics 3124, 3126, 3128, 3130, 3132, 3134, 3136, 3138 similar to the basic graphics of the example process variable summary panes 1800, 2200 described in connection with FIGS. 18 and 22. In some examples, operators may select one or more of the process variables (e.g., those listed within the alarm banner 3120) for review in a second process variable summary pane 3140. In the illustrated example, the second process variable summary pane 3140 provides detailed graphics 3142, 3144, 3146 similar to the detailed graphics described above in connection with FIGS. 20 and 24. In this manner, an operator can isolate the process variables that potentially need attention and/or quickly review the additional information provided by the detailed graphics 3142, 3144, 3146. In some examples, operators may select specific process variables or parameters for the second process variable summary pane 3140 by selecting (e.g., by right-clicking with a mouse) a particular graphic within one of the process variable summary panes 3122, 3140 and then selecting from a resulting pop-up (e.g., in a drop-down menu) an existing process variable summary pane (e.g., the first process variable summary pane 3122 or the second process variable summary pane 3140) to which the graphic is to be added and/or creating a new process variable summary pane for the particular graphic selected. Additionally or alternatively, the pop-up options available upon selecting (e.g., by right-clicking with a mouse) one of the graphics 3124, 3126, 3128, 3130, 3132, 3134, 3136, 3138, 3142, 3144, 3146 may also enable operators to open a faceplate for the corresponding parameter or process variable and/or to navigate to a different process diagram 304 associated with another component of the process control system that also contains the corresponding process variable.

Figure 32:
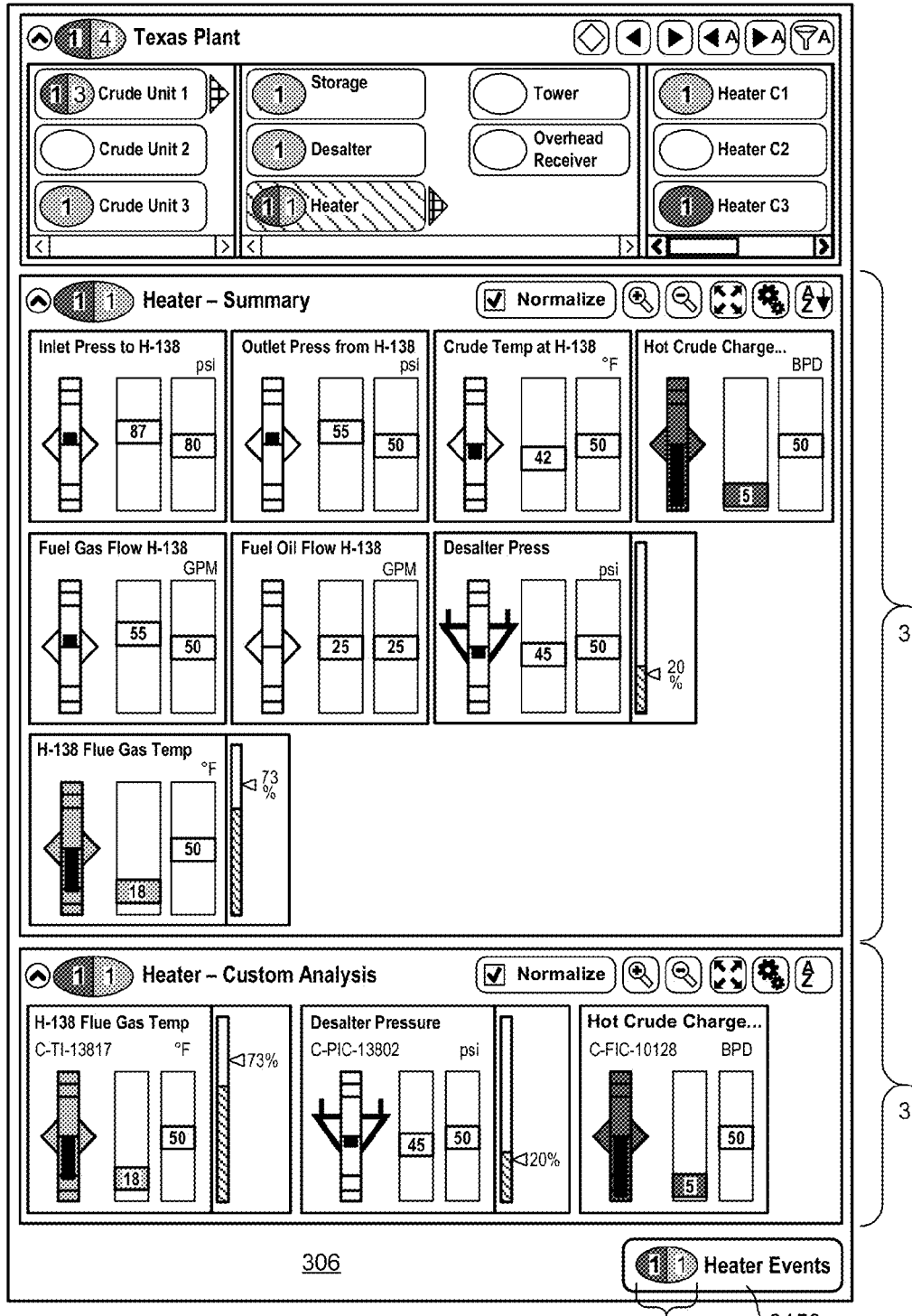
FIG. 32 illustrates the example sidebar of FIG. 31B after expanding the basic graphics of the process variable summary pane to mid-level graphics.

Furthermore, as described above in connection with FIGS. 22-25, operators may select the zoom in button 2228 in the process variable summary pane 3122 to request the basic graphics 3124, 3126, 3128, 3130, 3132, 3134, 3136, 3138 to be expanded out to mid-level graphics (e.g., as described in connection with FIGS. 19 and 23) and/or detailed graphics (e.g., FIGS. 20 and 24). However, as shown in the illustrated example of FIG. 31B, the sidebar 306 does not contain adequate space to expand the basic graphics 3124, 3126, 3128, 3130, 3132, 3134, 3136, 3138 of the process variable summary pane 3122 to mid-level graphics because of the second process variable summary pane 3140 containing the detailed graphics 3142, 3144, 3146. Accordingly, in some examples, to maintain all the desired information displayed within the sidebar 306, if an operator zooms in on the process variable summary pane 3122 to mid-level graphics, the second process variable summary pane 3140 automatically zooms out from the details graphics 3142, 3144, 3146 to corresponding mid-level graphics. Thus, FIG. 32 illustrates the example sidebar 306 of FIG. 31B after the process variable summary pane 3122 has been expanded to include mid-level graphics and the second process variable summary pane 3140 has correspondingly adjusted to also include mid-level graphics. In this manner, operators can drill down to obtain any desired information while maintaining all other information on the screen such that the operators can compare the information in context without having to scroll back and forth, swap between display screens, and/or have to relocate information each time the operator desires to review the information. Additionally or alternatively, if the zooming in on the process variable summary pane 3122 consumed more space within the sidebar 306, the second process variable summary pane 3140 may zoom out further to contain only basic graphics associated with the corresponding process variables and/or entirely collapse to the top banner similar to what is shown in FIG. 25.

Returning to FIGS. 31A-31B, inasmuch as the example icons 3104, 3106, 3108, 3110, 3112, 3114, 3116, 3118 and related information may appear multiple places within the operator interface 300, in some examples, when an operator selects (e.g., via mouse click) or hovers (e.g., with a mouse pointer) over one of the icons 3104, 3106, 3108, 3110, 3112, 3114, 3116, 3118 or corresponding graphics 3124, 3126, 3128, 3130, 3132, 3134, 3136, 3138, 3142, 3144, 3146, each location within the operator interface 300 associated with the process variable selected that shows the corresponding icon or graphic may be highlighted, outlined, or otherwise identified (e.g., the thick solid outline 3148 shown in the process diagram 304 and alarm banner 3120 of FIG. 31A and around the graphics 3138, 3142 of the process variable summary panes 3122, 3140 of FIG. 31B). In this manner, operators can quickly determine relationships between information without having to match or look up tags or compare data entries in some other way.

The use of the example icons 3104, 3106, 3108, 3110, 3112, 3114, 3116, 3118, and all the information they convey, positioned within the process diagram 304, the alarm banner 3120, and the process variable summary panes 3122, 3142, along with the ability to zoom in and out for more or less detail as desired enables operators to quickly assess the current condition(s), forecasted trend(s) or projected state(s), and/or relationship(s) of process variables in an intuitive manner. Additionally, by combining this ability with the use of the example navigation pane 308, operators are enabled to quickly move around an entire process control system and understand what they are viewing and how it relates to other components within the process control system. Furthermore, with the use of a common interface and appropriate icons for each process diagram 304 associated with particular components within the process control system, each time operators switch screens to view a different part of the process control system, the operators can quickly determine what they are looking at, how it relates to what was previously viewed and/or other parts of the process control system, determine what the key issues are (e.g., alarms, etc.), identify the locations (e.g., components) within the process control system where the issues appear, and navigate to a screen (e.g., a process diagram 304) associated with the issues to thereby assess and/or diagnose the issues in a wider context of the entire process control system and prioritize tasks that are most important.

Additionally, as shown in FIGS. 31B and 32, in some examples, the sidebar 306 includes an event history button 3150 to provide operators with more temporal context for the events (e.g., alarms) and further augment the trend-based monitoring and analysis of the condition of the process control system. As shown in the illustrated example, the event history button 3150 includes an alarm summary icon 3152 similar or identical to the alarm summary icons 2626, 2824 described above in connection with FIGS. 26-29. In some examples, selecting the event history button 3150 opens an event summary table 3300, an example of which is illustrated in FIG. 33, that provides additional information about alarms and/or other events monitored in the process control system. In some examples, the event history table 3300 may be displayed within the sidebar 306 of the operator interface 300. In other examples, the event history table 3300 may be generated in a pop-up window and/or other display area.

As shown in FIG. 33, the information provided in the event history table 3300 is based on key changes, alarms, and/or events within the process control system that are tagged over time to provide situational awareness and recovery for operators to better diagnose potential problems and understand how they relate to other aspects of the process control system. For example, the event history table 3300 includes the date and time (e.g., hours and minutes) of each event, a description of the event, the unit and/or parameter associated with the event, and action items to be performed and/or already completed that are associated with the event. In addition to the above information, the event history table 3300 also includes a column corresponding to the status and/or impact of the event. As shown in the illustrated example, the status and/or impact column of the event history table 3300 incorporates trend-based graphics 3302 corresponding to the graphics used throughout the operator interface 300 as described above. In this manner, operators may quickly identify the timing and relationships of the process variables associated with the graphics 3302 that are displayed throughout the operator interface 300.

Figure 34A:
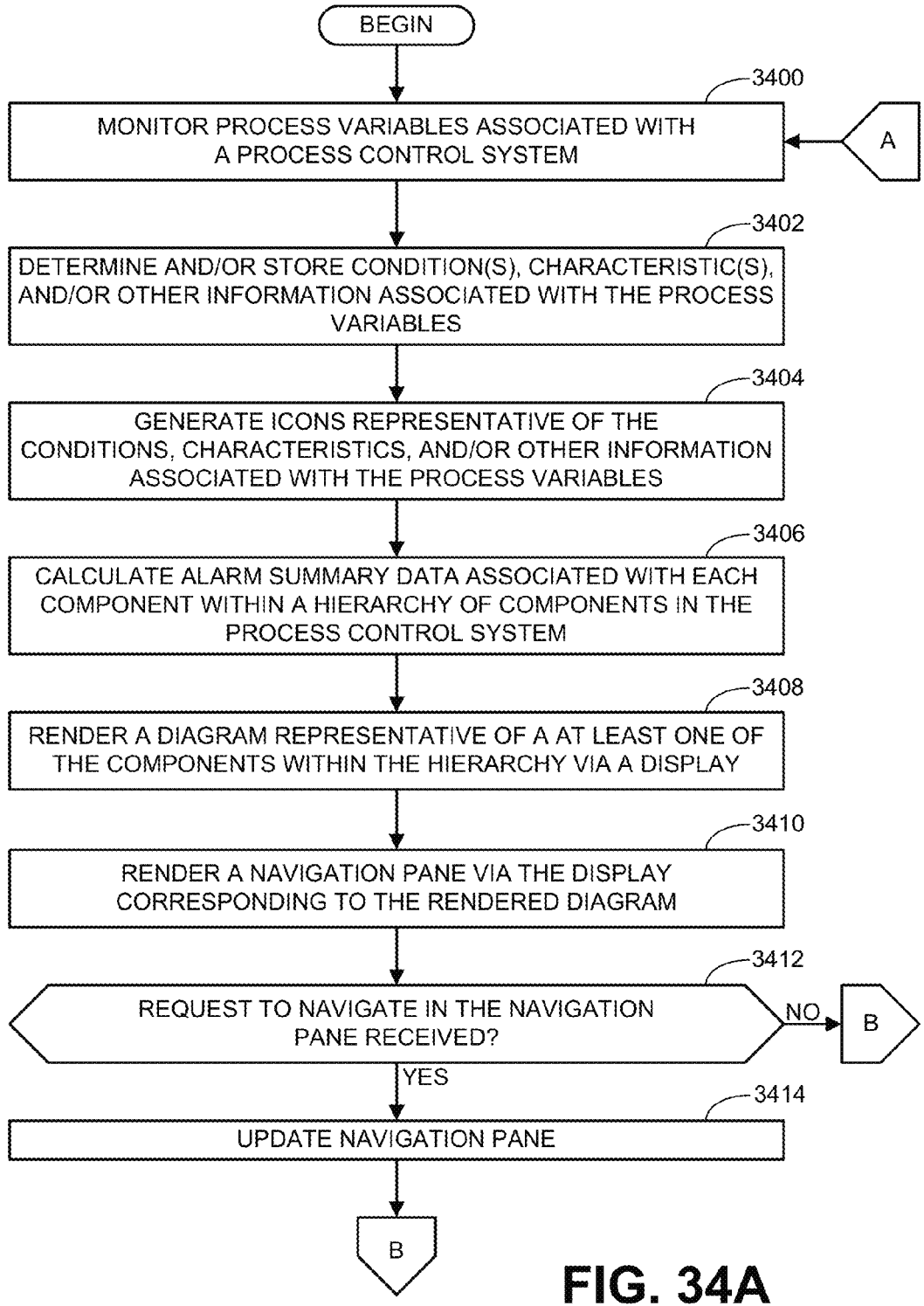
FIGS. 34A-34B is a flowchart representative of example machine readable instructions for implementing the example operator station 104 of FIGS. 1 and/or 2.
Figure 34B:
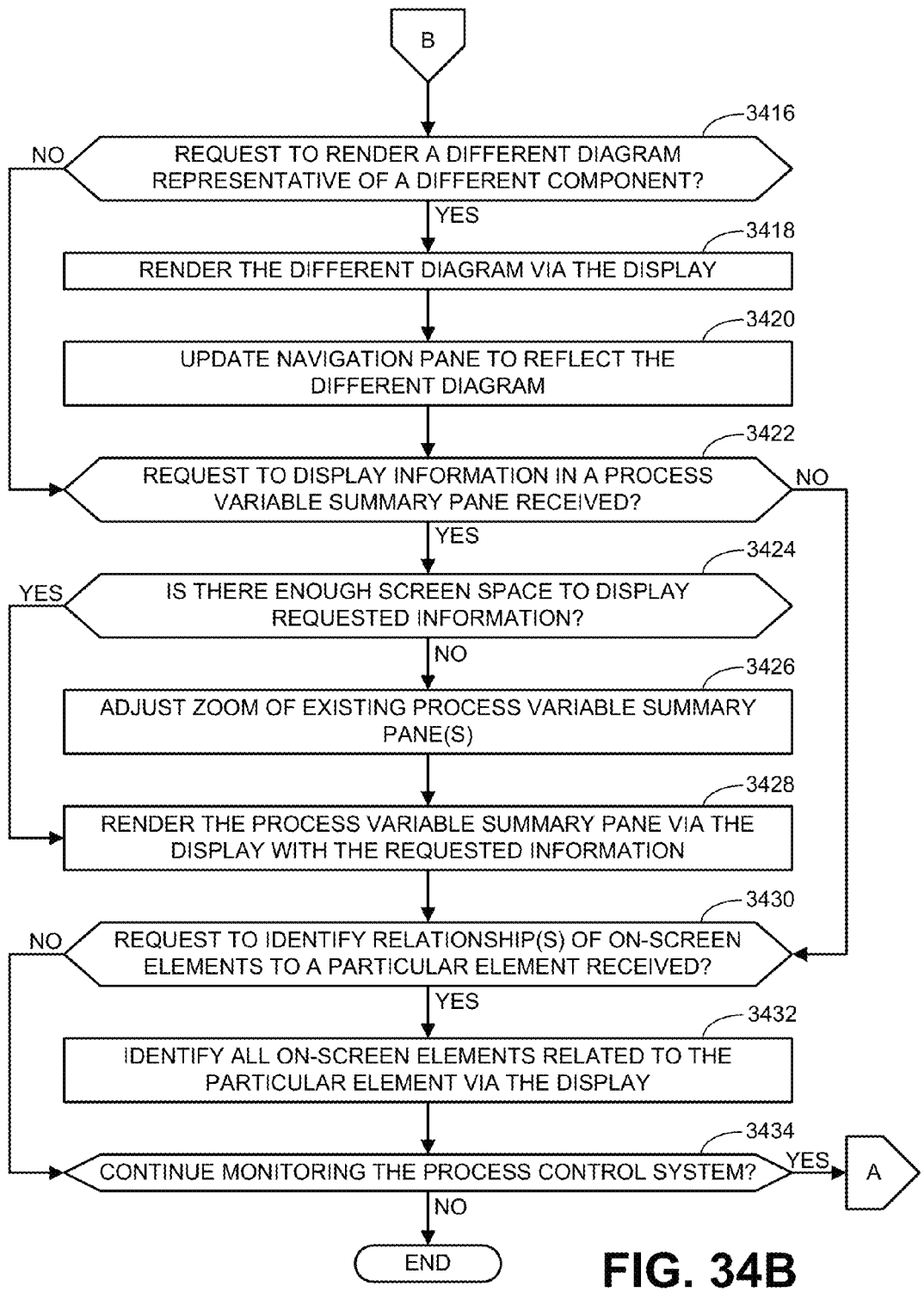

A flowchart representative of an example method for implementing the example operator station 104 of FIG. 2 is shown in FIGS. 34A-34B. In this example, the method may be implemented using machine readable instructions that comprise a program for execution by a processor such as the processor 3512 shown in the example processor platform 3500 discussed below in connection with FIG. 35. The program may be embodied in software stored on a tangible computer readable storage medium such as a CD-ROM, a floppy disk, a hard drive, a digital versatile disk (DVD), a Blu-ray disk, or a memory associated with the processor 3512, but the entire program and/or parts thereof could alternatively be executed by a device other than the processor 3512 and/or embodied in firmware or dedicated hardware. Further, although the example program is described with reference to the flowchart illustrated in FIGS. 34A-

34B, many other methods of implementing the example operator station 104 may alternatively be used. For example, the order of execution of the blocks may be changed, and/or some of the blocks described may be changed, eliminated, or combined.

As mentioned above, the example process of FIGS. 34A-34B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example process of FIGS. 34A-34B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The program of FIGS. 34A-34B begins at block 3400 by an operator application (e.g., the example operator application 208 of FIG. 2) monitoring process variables associated with a process control system (e.g., the example process control system 100 of FIG. 1). At block 3402, the operator application determines and/or stores condition(s), characteristic(s), and/or other information associated with the process variables. The condition(s), characteristic(s), and/or other information may include any of a current state of a process variable, a projected state of the process variable, a corresponding trend of the process variable, a direction of change of the process variable, a rate of change of the process variable, a relative position of the process variable with respect to a set point (e.g., above, below, or approximately at the set point), a relative deviation of the process variable from the set point with respect to an operational range of values for the process variable, a relative distance of the process variable with respect to an alarm limit, an actual value of the process variable, and/or the historical or archived values of the process variable tagged over time.

At block 3404, an operator display module (e.g., the operator display module 206 of FIG. 2) generates icons representative of the condition(s), characteristic(s), and/or other information associated with the process variables. For example, the generated icons may correspond to any of the icons described above in connection with FIGS. 4-17. At block 3406, the operator display module also calculates alarm summary data associated with each component within a hierarchy of components in the process control system. The alarm summary data corresponds to one or more of the presence of an active alarm associated with a process variable corresponding to each of the components, the number of the active alarms associated with each of the components, the current state of each of the corresponding process variables, or a projected state of each of the corresponding process variables. As described above, each component may correspond to any of a plant, site, area, unit, module, etc., and higher level components in the hierarchy may contain multiple lower level components. Thus, the alarm summary data of each higher level component may include the alarm summary data of corresponding lower level components (e.g., subcomponents).

At block 3408, an operator interface (e.g., the operator interface 210 of FIG. 2) renders a diagram representative of at least one of the components within the hierarchy via a display. In some examples, the component for display is selected based on a user input (e.g., an operator input). In some examples, the diagram is a piping and instrumentation diagram (P&ID) composed of multiple elements representative of various aspects and/or subcomponents of the selected component for display. Furthermore, the diagram may provide key indicators and/or other relevant information associated with the process variables corresponding to the displayed component of the process control system. In the example process of FIGS. 34A-34B, when the operator interface renders the diagram, the operator interface includes the generated icons (block 3404) adjacent to, or in place of, the key indicators and/or other relevant information. For example, the icons may be displayed next to elements in the P&ID corresponding to the source of the corresponding process variables. Additionally, the icons associated with process variables in an alarm state may also be rendered within an alarm banner.

At block 3410, the operator interface renders a navigation pane via the display corresponding to the rendered diagram. The navigation pane includes navigation buttons representative of components within the hierarchy similar to any of the navigation panes described above in connection with FIGS. 26-29. In such examples, each navigation button may be associated with a corresponding alarm summary icon that is representative of the calculated alarm summary data (block 3406).

At block 3414, the operator application determines whether a request to navigate within the navigation pane has been received. A request to navigate within the navigation pane may arise from an operator selecting (e.g., via a mouse click) on a navigation button that is not within a direct path of the hierarchy associated with component currently represented by the displayed diagram (e.g., previewing the relationship of other components). If the operator application determines that such a request has been received (block 3412), the operator interface updates the navigation pane. The updated navigation pane may include new navigation buttons corresponding to components at a lower level in the hierarchy below the component associated with the selected navigation button (e.g., child components). Furthermore, an indication of the direct path in the hierarchy to the navigation button associated with the currently displayed diagram may also be provided if the new navigation buttons prevent the entire path from being represented. Once the navigation pane has been updated (block 3414), control advances to block 3416. If the operator application determines that a request to navigate within the navigation pane has not been received (block 3412), control immediately advances to block 3416.

At block 3416, the operator application determines whether a request to render a different diagram representative of a different component of the process control system has been received. A request to render a different diagram may arise from an operator selecting (e.g., via double-mouse click) a navigation button corresponding to a different component than the component currently represented by the rendered diagram. In other examples, an operator may select (e.g., via double-mouse click) an element within the diagram corresponding to a subcomponent within the currently displayed component. If the operator application determines that a request has been received (block 3412), the operator interface renders the different diagram via the display (block 3418). As described above in connection with block 3408, the operator interface may display different icons corresponding to the process variables associated with the component represented by the new diagram within the diagram. In addition to rendering the new diagram (block 3418), the operator interface updates the navigation pane to reflect the different diagram rendered (block 3420). For example, the navigation button associated with the component represented by the new diagram may be altered to be visually identifiable from other navigation buttons as described above. After updating the navigation pane (block 3420), control advances to block 3422. Returning to block 3416, if the operator application determines that a request to render a different diagram has not been received (block 3412), control immediately advances to block 3422.

At block 3422, the operator application determines whether a request to display information in a process variable summary pane has been received. The process variable summary pane may be similar to any of the process variable summary panes described above in connection with FIGS. 18-25. A request to display information within a process variable summary pane may include an operator requesting a new process variable summary pane to be created or for an existing process variable summary pane to be expanded to display additional information. If the operator application determines that such a request is received (block 3422), the operator display module determines whether there is enough space within a designated display area to display the requested information (block 3424). Whether there is enough space depends on size of the designated display area, the amount of information that is requested to be displayed, and what information is already displayed. In some examples, the designated display area corresponds to a screen space on an output display device having a defined size (e.g., a defined width and height of pixels) such as, for example, the sidebar 306 shown and described in connection with FIGS. 30-32. In such examples, as more process variables are to be summarized and/or as more information is to be represented (e.g., via basic graphics, mid-level graphics, or detailed graphics), more screen space is needed to display the requested information. In such examples, the total amount of information to be displayed (based on what is already displayed and the additional information requested) may exceed the available area defined by the screen space and the operator station would determine that there is not enough space within the designated area to display the requested information (block 3424).

In other examples, the designated display area is not limited to a particular size but can vary depending upon the information requests of an operator at any particular moment. As such, in some examples, the designated display area may be greater in size than the corresponding display screen through which the designated display area is rendered such that only a portion of the designated display area is available at any given moment (e.g., by scrolling up or down). For example, rather than displaying the requested information in a sidebar (e.g., the sidebar 306) on a display screen of an operator station, in some examples, the requested information is displayed via an interface of a portable handheld device (e.g., a smart phone, tablet, etc.) where the screen size and/or resolution is limited. In some such examples, the requested information, as represented by the icons and related graphics described herein, is displayed in an independent interface that takes up all or substantially all of the screen display area of the corresponding display device (e.g., the icons are shown without displaying a corresponding P&ID) with the ability to scroll between various portions of the designated display area when it cannot all be rendered within a single screen of the display device. In such examples, the operation application may determine that there is enough space within the designated display area to display the requested information (block 3424), because the designated display area is not limited to a defined size.

Continuing in the example process, if the operator display module determines there is not enough space within the designated display area (block 3424), the operator interface adjusts the zoom of existing process variable summary pane(s) (block 3426). For example, the operator interface may reduce the existing process variable summary pane(s) to a lower level of detail and/or collapse the summary pane to only display the top banner. Once the existing process variable summary pane(s) have been adjusted (block 3426), the operator interface renders the process variable summary pane with the requested information via the display (block 3428). If the operator display module determines that there is enough space within the designated display area (or the display area can dynamically change size) to display the requested information (block 3424), the operator interface directly renders the corresponding process variable summary pane (block 3428). Once the process variable summary pane has been rendered, control advances to block 3430. Returning to block 3422, if the operator application determines that a request to display information in a process variable summary pane has not been received, the example process of FIGS. 34A-34B advances to block 3430.

At block 3430, the operator application determines whether a request to identify relationship(s) of on-screen elements to a particular element has been received. On-screen elements may correspond to any of graphical elements within the diagram representative of components or subcomponents within the process control system, textual elements within the diagram providing information associated with process variables corresponding to the displayed components, icons displayed within the diagram corresponding to the process variables, information in an alarm banner, and/or graphics within one or more process variable summary panes. A request to identify a relationship between any of the above elements may arise from an operator selecting (e.g., via a mouse click, mouse hover, etc.) one of the displayed elements. If the operator application determines that such a request has been received (block 3430), the operator interface identifies the on-screen elements associated with particular element selected via the display (block 3432). That is, the components represented within the diagram may be identified along with the corresponding navigation button in the navigation pane as described above in connection with FIG. 30. Additionally or alternatively, an alarm banner entry, an icon and/or textual information in the diagram, and/or one or more graphics in one or more process variable summary panes associated with the same process variable may be identified as described above in connection with FIGS. 31A-31B.

Once related elements are identified (block 3432), control advances to block 3434. If the operator application determines that a request to identify relationship(s) of elements has not been received, control advances directly to block 3434. At block 3434, the operator application determines whether to continue monitoring the process control system. If the process control system is to be monitored, control returns to block 3400 of the example process. If the operator application determines not to continue monitoring the process control system, the example process of FIGS. 34A-34B ends.

Figure 35:
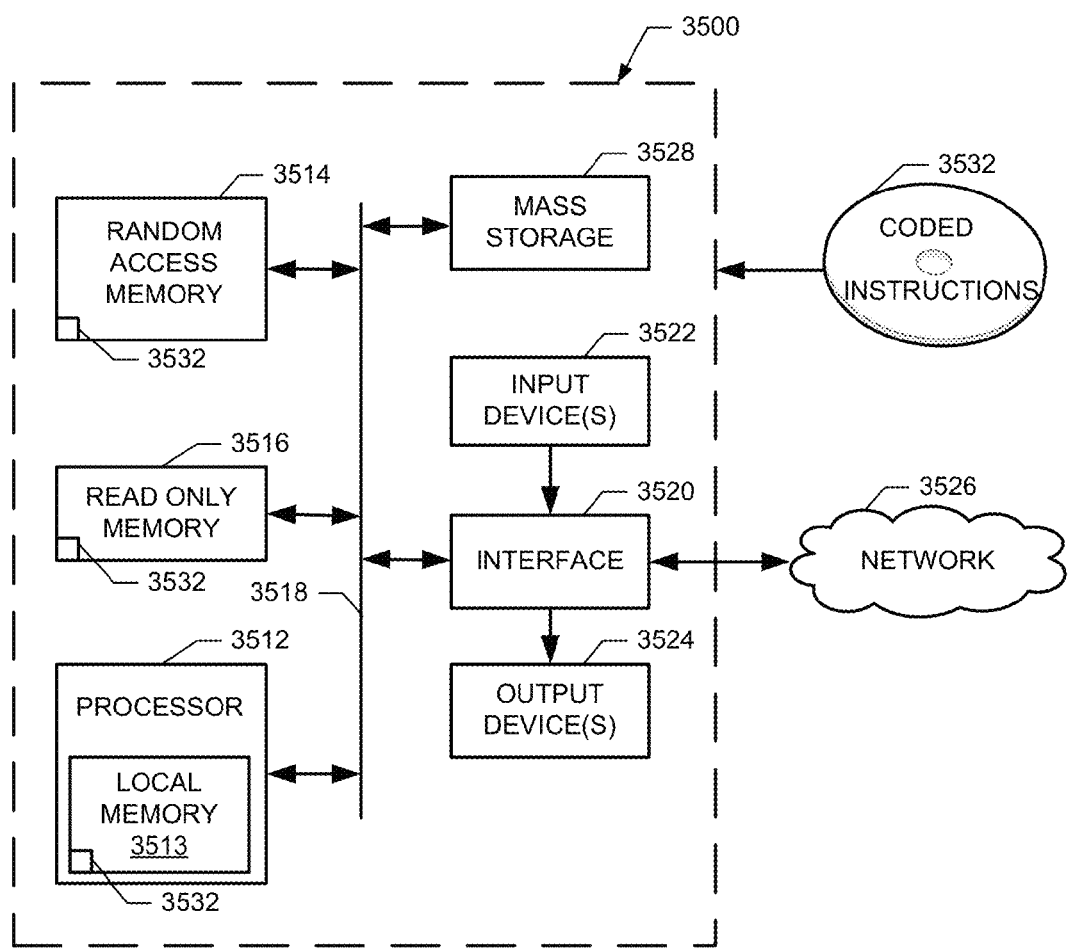
FIG. 35 is a schematic illustration of an example processor platform that may be used and/or programmed to carry out the example process of FIGS. 34A-34B and/or, more generally, to implement the example operator station of FIGS. 1 and/or 2.

FIG. 35 is a block diagram of an example processor platform 3500 capable of executing the instructions of FIGS. 34A-34B to implement the operator station 104 of FIG. 2. The processor platform 3500 can be, for example, a server, a personal computer, a mobile device (e.g., a cell phone, a smart phone, a tablet such as an iPad™), a personal digital assistant (PDA), an Internet appliance, or any other type of computing device.

The processor platform 3500 of the illustrated example includes a processor 3512. The processor 3512 of the illustrated example is hardware. For example, the processor 3512 can be implemented by one or more integrated circuits, logic circuits, microprocessors or controllers from any desired family or manufacturer.

The processor 3512 of the illustrated example includes a local memory 3513 (e.g., a cache). The processor 3512 of the illustrated example is in communication with a main memory including a volatile memory 3514 and a non-volatile memory 3516 via a bus 3518. The volatile memory 3514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3516 may be implemented by flash memory and/or any other desired type of memory device. Access to the main memory 3514, 3516 is controlled by a memory controller.

The processor platform 3500 of the illustrated example also includes an interface circuit 3520. The interface circuit 3520 may be implemented by any type of interface standard, such as an Ethernet interface, a universal serial bus (USB), and/or a PCI express interface.

In the illustrated example, one or more input devices 3522 are connected to the interface circuit 3520. The input device(s) 3522 permit a user to enter data and commands into the processor 3512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 3524 are also connected to the interface circuit 3520 of the illustrated example. The output devices 3524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 3520 of the illustrated example, thus, typically includes a graphics driver card.

The interface circuit 3520 of the illustrated example also includes a communication device such as a transmitter, a receiver, a transceiver, a modem and/or network interface card to facilitate exchange of data with external machines (e.g., computing devices of any kind) via a network 3526 (e.g., an Ethernet connection, a digital subscriber line (DSL), a telephone line, coaxial cable, a cellular telephone system, etc.).

The processor platform 3500 of the illustrated example also includes one or more mass storage devices 3528 for storing software and/or data. Examples of such mass storage devices 3528 include floppy disk drives, hard drive disks, compact disk drives, Blu-ray disk drives, RAID systems, and digital versatile disk (DVD) drives.

Coded instructions 3532 to implement the operations of FIGS. 34A-34B may be stored in the mass storage device 3528, in the volatile memory 3514, in the non-volatile memory 3516, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
monitoring process variables in a process control system;
determining a current state of a first one of the process variables;
determining a trend associated with the first process variable;
generating a first graphic having visual content defining an outer boundary of the first graphic, the visual content of the first graphic including a set point indicator and a process variable indicator, the first graphic being dynamically adjustable to represent information associated with the first process variable, the information comprising the current state of the first process variable, a relative position of the first process variable with respect to a set point, and the trend of the first process variable, the trend of the first process variable represented by the visual content of the first graphic based on a slant of an edge of the outer boundary, the current state represented by the first graphic based on at least one of a shape of the outer boundary or the visual content within the outer boundary, the relative position of the first process variable with respect to the set point represented by the first graphic based on a relative position of the process variable indicator to the set point indicator; and
rendering the first graphic via a display, wherein the first graphic is utilized by an operator of the process control system to facilitate an assessment of a condition of the process control system and to facilitate trend-based monitoring and analysis of the condition of the process control system.

2. The method of claim 1, wherein the information represented by the first graphic further comprises a rate of change of the first process variable.

3. The method of claim 1, wherein the information represented by the first graphic further comprises a projected state of the first process variable.

4. The method of claim 1, wherein the information represented by the first graphic further comprises at least one of a relative distance of the first process variable with respect to an alarm limit, or a relative deviation of the first process variable from the set point with respect to a range of operational values.

5. The method of claim 1, wherein the information represented by the first graphic further comprises whether the trend of the first process variable is at least one of increasing, decreasing, improving, worsening, oscillating, maintaining, or indeterminate.

6. The method of claim 1, wherein the information represented by the first graphic further comprises at least one of a current value of the first process variable, a current value of the set point, a current value of an alarm limit, an output associated with the first process variable, a graph representing the trend associated with the first process variable, or alarm tagging over time.

7. The method of claim 1, further comprising:
generating a second graphic representative of the information associated with the first process variable, the second graphic to represent more of the information than the first graphic; and
rendering the second graphic via the display.

8. The method of claim 7, wherein the second graphic is rendered along with the first graphic.

9. The method of claim 7, further comprising:
rendering a first plurality of graphics corresponding to a first portion of the process variables, the first plurality of graphics including the first graphic;
rendering a second plurality of graphics corresponding to a second portion of the process variables, the second plurality of graphics to represent more of the information than the first plurality of the graphics, the second plurality of graphics including the second graphic;
receiving a request to render a third plurality of graphics corresponding to the first portion of the process variables, the third plurality of graphics to represent more information than the first plurality of graphics;
rendering the third plurality of graphics via the display, the third plurality of graphics replacing the first plurality of graphics; and
rendering a fourth plurality of graphics corresponding to the second portion of the process variables via the display, the fourth plurality of graphics to represent less information than the second plurality of graphics, the fourth plurality of graphics replacing the second plurality of graphics.

10. The method of claim 7, wherein the second graphic contains a visual representation of the first graphic.

11. The method of claim 1, further comprising:
determining a hierarchy of components of the process control system, the hierarchy comprising first components associated with a first level of the hierarchy and second components associated with a second level of the hierarchy, wherein ones of the first components contain one or more of the second components, the first and second components corresponding to at least one of plants, sites, areas, units, equipment modules, or control modules in the process control system;
generating a process diagram to graphically represent a selected component corresponding to one of the first components or the second components, the process diagram comprising elements representative of subcomponents within the selected component, the first process variable associated with a first one of the subcomponents; and
rendering the process diagram via the display, wherein the first graphic associated with the first process variable is rendered within the process diagram adjacent the first subcomponent.

12. The method of claim 11, further comprising:
generating first navigation buttons corresponding to the first components in the first level of the hierarchy;
generating second navigation buttons corresponding to the second components in the second level of the hierarchy; and
rendering a navigation pane via the display comprising at least some of the first and second navigation buttons to graphically indicate a relationship of the first and second components in the hierarchy, the navigation pane including a selected navigation button corresponding to the selected component.

13. The method of claim 12, further comprising:
graphically identifying any of the first or second navigation buttons corresponding to the first or second components within a path in the hierarchy from a top level component down to the selected component; and
graphically distinguishing the selected navigation button from the other first and second navigation buttons.

14. The method of claim 12, further comprising:
determining summary data associated with active alarms for each of the first and second components, the summary data comprising at least one of a presence of one or more active alarms corresponding to one or more of the process variables associated with each of the first and second components, a number of the active alarms associated with each of the first and second components, the current state of each of the one or more process variables associated with each of the first and second components, or a projected state of each of the one or more process variables associated with each of the first and second components; and
rendering alarm summary icons with each of the first and second navigation buttons indicative of the summary data corresponding to each of the first and second components associated with the corresponding first and second navigation buttons, wherein the alarm summary icons associated with the first navigation buttons include the summary data associated with the second components contained within the corresponding first component.

15. The method of claim 1, wherein a first portion of the shape of the outer boundary is defined by a triangle, an orientation of the triangle indicating a direction of the trend.

16. The method of claim 15, wherein a second portion of the shape of the outer boundary is defined by a quadrilateral positioned adjacent to the triangle, the quadrilateral indicating a predicted state of the first process variable.

17. A tangible machine readable storage device or disc comprising instructions that, when executed, cause a machine to at least:
monitor a process variable in a process control system;
generate a dynamically adjustable icon, the icon having visual content defining an outer boundary of the icon, the visual content of the icon including a set point indicator and a process variable indicator, the visual content of the icon indicative of information associated with the process variable, the information including (1) a current state of the process variable represented by the visual content of the icon based on at least one of a shape of the outer boundary or the visual content within the outer boundary, (2) a relative position of the process variable with respect to a set point represented by the visual content of the icon based on a relative position of the process variable indicator to the set point indicator, and (3) a trend of the process variable represented by the visual content of the icon based on a slant of an edge of the outer boundary; and
render the icon via a display, wherein the icon is utilized by an operator of the process control system to facilitate an assessment of a condition of the process control system and to facilitate trend-based monitoring and analysis of the condition of the process control system.

18. The storage device or disc of claim 17, wherein the icon is concurrently rendered in at least two locations within the display.

19. The storage device or disc of claim 18, wherein the at least two locations correspond to at least one of a first location in a diagram graphically representative of one or more components of the process control system, a second location in an alarm banner, or a third location in a sidebar.

20. The storage device or disc of claim 17, wherein the current state is graphically represented by a color or shading of a first portion of the icon.

21. The storage device or disc of claim 20, wherein the information represented by the icon further comprises a projected state, the projected state graphically represented by a color or shading of a second portion of the icon.

22. The storage device or disc of claim 17, wherein the shape of the outer boundary varies to indicate when the trend of the process variable is increasing, decreasing, oscillating, maintaining, or indeterminate.

23. The storage device or disc of claim 17, wherein the information represented by the icon further comprises whether the trend is improving or worsening, a worsening trend graphically represented by a thick border of a portion of the icon.

24. The storage device or disc of claim 17, wherein the information represented by the icon further comprises a relative deviation of the process variable from the set point with respect to a range of operational values, the relative deviation graphically represented by the spatial relationship of the set point indicator and the process variable indicator relative to a range indicator.

25. The storage device or disc of claim 24, wherein the information represented by the icon further comprises a relative distance of the process variable with respect to an alarm limit, the relative distance graphically represented by the spatial relationship of the set point indicator, the process variable indicator, and the range indicator relative to an alarm limit indicator.

26. The storage device or disc of claim 17, wherein the information represented by the icon further comprises a rate of change of the process variable, the rate of change graphically represented by a number of rate indicators associated with the icon.

27. An apparatus comprising:
a processor to monitor a process variable in a process control system, the processor to generate a dynamically adjustable icon to graphically represent (1) a current state of the process variable based on at least one of a shape of an outer boundary of the icon or a first portion of visual content within the outer boundary, (2) a relative position of the process variable with respect to a set point based on a relative position of a process variable indicator included in the visual content to a set point indicator included in the visual content, (3) a projected state of the process variable based on at least one of the shape of the outer boundary or a second portion of the visual content within the outer boundary, and (4) a trend of the process variable based on an angle of an edge of the outer boundary; and
a display to render the icon via an operator interface, wherein the icon is to be utilized by an operator of the process control system to facilitate an assessment of a condition of the process control system and to facilitate trend-based monitoring and analysis of the condition of the process control system.

28. The apparatus of claim 27, wherein information represented by the icon further comprises at least one of a relative distance of the process variable with respect to an alarm limit, or a relative deviation of the process variable from the set point with respect to a range of operational values.

29. The apparatus of claim 28, wherein the icon is concurrently rendered in at least two locations within the display.

* * * * *